US008280261B2

(12) United States Patent
Castanon Avila et al.

(10) Patent No.: US 8,280,261 B2
(45) Date of Patent: Oct. 2, 2012

(54) OPTICAL SIGNAL PHASE REGENERATOR FOR FORMATS OF DIFFERENTIAL MODULATION WITH PHASE CHANGES

(75) Inventors: Gerardo Antonio Castanon Avila, Monterrey (MX); Ivan Aritz Aldaya Garde, Navarra (ES)

(73) Assignee: Instituto Technologico y de Estudios Superiores de Monterrey, Monterrey (MX)

( * ) Notice: Subject to any disclaimer, the term of this patent is extended or adjusted under 35 U.S.C. 154(b) by 468 days.

(21) Appl. No.: 12/519,136

(22) PCT Filed: Dec. 14, 2007

(86) PCT No.: PCT/MX2007/000154
§ 371 (c)(1),
(2), (4) Date: Sep. 28, 2009

(87) PCT Pub. No.: WO2008/072945
PCT Pub. Date: Jun. 19, 2008

(65) Prior Publication Data
US 2010/0086313 A1   Apr. 8, 2010

(30) Foreign Application Priority Data
Dec. 15, 2006 (MX) ............... NL/a/2006/000103

(51) Int. Cl.
*H04B 10/02* (2006.01)
*H04B 10/12* (2006.01)
*H04B 10/08* (2006.01)
*H04B 10/04* (2006.01)
(52) U.S. Cl. ........ 398/154; 398/155; 398/140; 398/175; 398/79; 398/93; 398/176; 398/183
(58) Field of Classification Search ........... 398/140, 398/154, 155
See application file for complete search history.

(56) References Cited

U.S. PATENT DOCUMENTS

| | | | | |
|---|---|---|---|---|
| 5,020,872 A * | 6/1991 | DuPuy et al. | ............ | 385/16 |
| 5,522,004 A * | 5/1996 | Djupsjobacka et al. | ...... | 385/123 |
| 5,926,297 A * | 7/1999 | Ishikawa et al. | ............ | 398/43 |
| 6,335,819 B1 * | 1/2002 | Cho et al. | ............ | 359/333 |
| 6,931,213 B2 * | 8/2005 | Desurvire | ............ | 398/175 |
| 7,352,973 B1 * | 4/2008 | Akasaka et al. | ............ | 398/175 |
| 7,421,210 B2 * | 9/2008 | Miyazaki | ............ | 398/188 |

(Continued)

FOREIGN PATENT DOCUMENTS
EP        1128582        8/2001
(Continued)

OTHER PUBLICATIONS

Masayuki, M, A Fiber-Based All-Optical 3R Regenerator for DPSK Signals, IEEE Photonics Technology Letters 19: 273-275 (2007).

(Continued)

*Primary Examiner* — Shi K Li
*Assistant Examiner* — Oommen Jacob
(74) *Attorney, Agent, or Firm* — Baker & McKenzie LLP

(57) ABSTRACT

The invention relates to a device for regenerating the phase of an optically modulated signal with phase changes and based on two and three replicas, wherein the replicas refer to the number of identical signals that are obtained form the input signal. This regenerator is capable of regenerating the phase and period of any format of modulation of optical communications systems which are differential modulation with phase changes, such as: DISK, DQPSK, RZ-DQPSK, RZ-DQPSK, D8PSK, D8PSK, RZ-D16PSK, D16PSK. The regenerator design presented involves the regenerator being placed alter the multiplexer of a communications system and before the signal modulators and/or decoders. Thus the regenerator receives the signal leaving the multiplexer and this signal is input in an amplitude modulator.

30 Claims, 21 Drawing Sheets

U.S. PATENT DOCUMENTS 7,734,194 B2 * 6/2010 Yonenaga et al. ............ 398/208
2007/0127929 A1 * 6/2007 Nishihara et al. ............ 398/155

FOREIGN PATENT DOCUMENTS

EP  1315320  5/2003

OTHER PUBLICATIONS

Leclerc, O., et al., Dense WDM (o.27 bit/s/Hz) 4 × 40Gbit /s dispersion-managed transmission over 10000 km with in-line optical regeneration by channel pairs, Electronic Letters 36: 337-338 (2000).

* cited by examiner

OPTICAL SIGNAL PHASE REGENERATOR FOR FORMATS OF DIFFERENTIAL MODULATION WITH PHASE CHANGES

CROSS-REFERENCE TO RELATED APPLICATIONS

This application is a 35 U.S.C. Section 371 of PCT/MX2007/000154 filed Dec. 14, 2007, which claims priority to Mexico Application No. NL/A/2006/000103 filed Dec. 15, 2006, which are incorporated herein by reference in their entirety.

OBJECT OF THE INVENTION

An optical signal phase regenerator for phase shift differential modulation is presented. This regenerator is capable of regenerating the phase and the period of any optical modulation format in communications systems that use phase shift differential modulation.

BACKGROUND OF THE INVENTION

In multichannel optical communication systems, different modulation formats may be utilized to transmit information over long distances. In digital communication systems, modulation formats use shifts in state, such as for example, a shift in the level of light power transmitted, a shift in the frequency of the light transmitted and also a shift in the phase of the light transmitted. Generally, there are three basic types of digital modulations which are used depending on the parameter selected:

ASK Modulation (Amplitude-Shift Keying). In this modulation the carrier is allowed to enter to represent bit 1, and is not transmitted to represent bit 0, digitally modulating the carrier's amplitude.

PSK Modulation (Phase-Shift Keying). The carrier is transmitted to represent 1 and the phase inverted carrier to represent 0, giving rise to a 180° phase jump in each transition from bit 1 to 0 and from 0 to 1, and for this reason it can be considered a digital modulation of the carrier phase.

FSK Modulation (Frequency-Shift Keying). An $f_{c1}$ frequency carrier is transmitted to represent bit 1 and an $f_{c2}$ frequency carrier to represent bit 0, being produced a digital modulation in frequency.

The wave forms of the basic types of modulation are shown in FIGS. 1(*a*), 1(*b*) and 1(*c*). FIG. 1(*a*) shows the modulation with amplitude changes. FIG. 1(*b*) shows the modulation with phase shifts. FIG. 1(*c*) shows a modulation with frequency shifts.

Phase Shift Keying

The Phase Shift Keying (PSK) modulation format and variations of it, are currently frequently used in military as well as commercial communication systems. The general analytic expression for PSK is described according to B. Sklar (1988) "Digital Communications: Fundamentals and Applications" (First Edition) New Jersey, Prentice Hall as:

$$s_i(t) = \sqrt{\frac{2E}{T}} \cos[\omega_o t + \phi_i(t)] \text{ for } \begin{array}{l} 0 \leq t \leq T \\ i = 1, \ldots, M \end{array}$$

where the phase end, $\phi(t)$, will have M discrete values, typically expressed as $$\phi_i(t) = \frac{2\pi i}{M} \text{ for } i = 1, \ldots, M$$

For example, of the binary PSK (BPSK) in FIG. 1(*b*), M is equal to 2. The symbol E stands for power, T for temporary duration, with $0 \leq t \leq T$. In the BPSK modulation, the signal data to be transmitted are modulated in the wave phase shift, $s_i(t)$, between one of these two states 0(0°) or π (180°). As can be seen in FIG. 1(*b*), the diagram shows one form of the typical BPSK wave with its abrupt phase shifts in the transition of symbols; if the flow of modulated data consists of an alternating sequence of ones and zeros, there would be abrupt shifts at each transition. The wave forms of the signals may be shown as vectors in a polar coordinates diagram; the length of the vector would correspond to the signal amplitude and the direction of the vector; generally speaking, M-ary, corresponds to the signal phase relative to other M−1 signals. In the specific of BPSK, the vector diagram would show the two vectors opposite to the 180° phase. The signals may decay by means of vectors in opposition to the phase called antipodal signals. We will show this vector representation afterwards when the DQPSK diagram is presented.

PSK modulation is usually used to obtain a modulation format which makes more sensitive detection mechanisms possible within the binary modulation schemes.

Below two different modulation formats are outlined and explained for which the regenerator proposed by this invention may be of application. This is done for the purpose of being able to explain with more clarity afterwards the operating of the phase regenerator described by this invention and also the transmission and receiver schemes which make up a multichannel communication system when modulation with phase shifts is used.

There are a great variety of modulation formats that use phase shifts to transmit information. In the following sections we will summarize the most modern modulation formats and on which a great many scientific articles have recently been published. These formats function through phase shifts such as Differential Phase Shift Keying (DPSK) and Differential Quadrature Phase Shift Keying (DQPSK).

Differential PSK Detection (Differential Phase Shift keying (DPSK)

The essence of PSK differential detection is that the identity of the data is referred to phase shifts between one symbol and another. The data are differentially detected examining the signal, where the transmitted signal is primarily differentially coded. In the case of DPSK modulation, the coded bit sequence, c(k), may be, generally speaking, obtained from the following two logical equations:

$$c(k) = c(k-1) \oplus m(k)$$

or $$c(k) = \overline{c(k-1) \oplus m(k)}$$

where the symbol ⊕ represents a sum in module 2 and the overbar shows the logical complement. In said expressions, m(k) stands for the original sequence of data to transmit bit to bit, c(k) stands for the coded bit obtained based on the logical operations indicated by the above equations and c(k−1) refers to the coded bit obtained prior to bit c(k). Afterwards, the information from the coded signal c(k) is translated in a phase shift sequence, θ(k), where bit '1' is characterized by a 180° phase shift and bit '0' is characterized by a 0° phase.

It should be mentioned that the differential coding process of a band base bit sequence prior to the modulation constitutes one of the simplest forms of coding as protection against errors. The bit sequence that is transmitted through many of the communication systems may intentionally invert their value inside the channel. Many signal processing circuits cannot discern whether any of the bit values transmitted have been inverted or not. This characteristic is known as phase ambiguity. Differential coding is used as protection against this possibility.

Below, the differential coding process is outlined via a numerical example of the information bits prior to being transmitted with the DPSK format. As has already been mentioned, a differential coding system consists of an addition operation in module two as illustrated in FIG. 2, where c(k)= c(k−1)⊕m(k), is as follows: m(k), sequence of entry data; c(k), bit to bit sequence of coded bits; c(k−1), coded bit obtained prior to c(k).

The manner in which a differential coder operates is described below. We are taking into account the bit sequence shown in FIG. 3. The coding circuit described possesses one reference bit which may be '0' or '1' The entry bit into the system coder is added to the reference bit, forming the second bit in the sequence of coded data. This bit obtained is added to the next information bit continuing the process described in FIG. 3, such as the Charan Langton reference, "Tutorial 2—What is Differential Phase Shift Keying?".

The decoding process performed in the receiver is the reverse of the process described above. The entering bit sequence is added together for the purpose of recreating the original data sequence as can be seen in FIG. 4. As can be seen, each bit is added to the adjacent bit that has a delay of 1 bit. On the other hand, there also are two possibilities, the bits have been correctly transmitted without producing any errors, and on the other hand, i.e., the sequence of data received has errors (containing bits whose value has been inverted along the transmission channel) as can be seen in FIG. 5.

The receiver's decoder circuit operate in the following manner, according to Charan Langton, "Tutorial 2—What is Differential Phase Shift Keying?". for each of the two possibilities shown in FIGS. 4 and 5. FIG. 4 shows a sequence of bits received with no errors and in FIG. 5, a sequence of bits is shown that was received with errors. In both cases, the benefit of using differential coding is that it makes it possible to recover the original signal transmitted.

The application of differential coding as phase shift coder arises from obtaining the formats of differential modulation (DPSK, DQPSK . . . ). The scheme of a DPSK detector is shown in FIG. 6 with the corresponding block diagram referred to by Sklar in 1988 as: "Digital Communications: Fundamentals and Applications" First Edition, New Jersey: Prentice Hall.

There are significant differences between the DPSK detector in FIG. 6 and a coherent PSK detector. A coherent PSK detector attempts to correlate the signal phases sent with a reference signal or local oscillator. Correlating the phase of two optical signals is an extremely difficult process. In fact this synchronization of the phases of two optical signals is the main reason for which coherent detection systems have not been developed for commercial equipment phases. In the case of a DPSK detector, the reference signal is simply a delayed version of the signal previously received. In other words, during each symbol time, each symbol received is compared with the previous symbol, and the correlation or anti-correlation between them are observed (180° out of phase).

The DPSK modulation format in contrast with PSK is much less demanding that PSK given that the information is coded as a shift (or absence of shift) in the optical phase of the signal.

DPSK is directly related to the systems with high transmission rates given that the phase fluctuation between the bits of two signals are reduced.

Although non-synchronized demodulation of a PSK signal is not strictly possible because the information resides in the carrier signal phase, detection by comparison of the phase associated with DPSK reduces the problems of synchronization associated with PSK coherent systems.

Format with Quadrature Phase Shift (Quadrature Phase Shift Keying (QPSK))

Reliable behavior of a system, represented by a low probability of error, is one of the important points to bear in mind when designing a digital communication system. Another important characteristic to keep in mind is efficiency in the use of band width or spectral efficiency defined as the ratio of bit transmission between the separation between channels (or carriers) in a multichannel system.

In the Quadrature Phase-Shift Keying (QPSK) modulation format, as well as the PSK binary format, the information to transmit is contained in the signal phase that is transmitted. In particular, the carrier signal phase acquires one of the following phase values, which are spaced an equal distance apart π/4, 3π/4, 5π/4 and 7π/4 radians For these values, the signal transmitted may be defined according to Simon Haykin, "Communication systems", 4th edition, Ed. John Wiley & Sons, pp. 311 as:

$$s_i(t) = \sqrt{\frac{2E}{T}} \cos\left(2\pi f_c t + \frac{\pi}{4}(2i-1)\right), \begin{array}{l} 0 \le t \le T \\ i = 1, 2, \ldots, 4 \end{array}$$

where E stands for the energy by the symbol of the signal transmitted and T stands for the duration of the symbol. The carrier signal frequency $f_c$ is equal to $n_c/T$ by one fixed integer $n_c$. Each phase value corresponds to a single pair of bits.

Spatial Diagram of the QPSK Signal

By using trigonometric identities and starting with the previous equation, the energy of the signal transmitted $s_i(t)$ may be redefined by the interval $0 \le t \le T$ through the expression defined by Simon Haykin, "Communication systems", 4th edition, Ed. John Wiley & Sons, pp. 311.

$$s_i(t) = \sqrt{\frac{2E}{T}} \cos\left(\frac{\pi}{4}(2i-1)\right)\cos(2\pi f_c t) - \sqrt{\frac{2E}{T}} \sin\left(\frac{\pi}{4}(2i-1)\right)\sin(2\pi f_c t),$$

$$i = 1, 2, \ldots, 4$$

As a result of this representation two fundamental observations may be made:

There are two basic orthogonal functions between them, $\phi_1(t)$ and $\phi_2(t)$, contained in the expression $s_i(t)$. Specifically, $\phi_1(t)$ and $\phi_2(t)$ are defined by a pair of carriers in quadrature, as referenced by Simon Haykin, "Communication systems", 4th edition, Ed. John Wiley & Sons, pp. 311

$$\phi_1(t) = \sqrt{\frac{2E}{T}} \cos(2\pi f_c t), 0 \le t \le T$$

$$\phi_2(t) = \sqrt{\frac{2E}{T}} \sin(2\pi f_c t), 0 \le t \le T$$

There are four points of information, which are associated with the signal vectors defined according to Simon Haykin, "Communication systems", 4th edition, Ed. John Wiley & Sons, pp. 311 as:

$$s_i(t) = \begin{bmatrix} \sqrt{E}\cos(\frac{\pi}{4}(2i-1)) \\ -\sqrt{E}\sin(\frac{\pi}{4}(2i-1)) \end{bmatrix}, i = 1, 2, \ldots, 4$$

The QPSK format has constellations of two sizes (N=2) and four points of information (M=4). The phase angles of which increase in direction exactly as shown in FIG. 7 according to Simon Haykin, "Communication systems", 4th edition, Ed. John Wiley & Sons, pp. 311.

Like the PSK modulation format, the QPSK possesses a minimum average power.

Differential Quadrature Phase Format Known as DQPSK which is the English Acronym for Differential Quadrature Phase Shift Keying Given that this modulation format constitutes the basis of the research, analysis, and comparison in this invention, the details of the R(ZH)N-DQPSK, described by O. Vassilieva, et al in "Non-Linear Tolerant and Spectrally Efficient 86 Gbit/s RZ-DQPSK Format for a System Upgrade" (OFC 2003) and by R. A. Griffin, et al "Optical differential quadrature phase-shift key (oDQPSK) for high capacity optical transmission", in Proceedings OFC'2002, pp. 367-368), where an exhaustive description of the architecture of transmitter and receiver schemes is given.

In the DQPSK modulation format, the information is coded in the optical signal phase in such a way that the phase may take one of these four possible values: 0, π/2, π and 3π/2 radians. Each value of the phase corresponds to one pair of bits, which is the symbol rate, exactly half of the bit rate. This characteristic makes any type of DQPSK format especially interesting because the effective "bit rate" of the transmission (B) only requires the use of B/2 from the electronic symbol rate. For example, it is possible to transmit at a bit rate of 40G bit per second with electronics that work at 20G Hertz due to the fact that in each symbol (identified by a phase shift) transmitted, two bits of information are sent.

DQPSK Signal Generation and Detection

In DQPSK modulation format, as in the DPSK format, it is necessary to precode the data in the transmitter to be able to use a simple and direct detection in the receiver. In the case of DQPSK, the necessary precoding function involves the implementation of a logical digital circuit which is considerably more complex than that associated with DPSK. Given that this is a multiphase modulation, with four different phase levels, the precoding function will posses two binary data entries, which will facilitate two outputs with the data that is already coded as described by R. A. Griffin, et al "Optical differential quadrature phase-shift key (ODQPSK) for high capacity optical transmission", in Proceedings OFC'2002, pp. 367-368).

Power Spectrum of the RZ-DQPSK Signals

The spectrum of an RZ-DQPSK at the output of a transmission system, as well as its corresponding electrical signal in the receiver, may be observed in FIGS. 8(a) and 8(b) respectively.

In FIG. 8(a) we see that the band width occupied by the modulated signal is extremely width. The majority of high capacity optical systems are based on multiplexation in the wavelength to be able to obtain greater transmission rates, wavelength division multiplexing (multiplexing by division of the wavelength). In this way, due to the necessity of multiplexing various channels in the same optical link, each of these needs to be limited in bandwidth. Therefore, it is necessary to make an optical filtration. This optical filtration is carried out in the multiplexors or demultiplexers of an optical system in such a way that the interference of a channel on the others is minimized until it complies with the requirements for interference between channels.

This optical filtration, causes transitory responses due to phase shifts in the modulated signal exactly as shown in FIG. 8(b). These transitory responses, in phase as well as in power, deteriorate the reconstruction of the information at the output of the system limiting in this way the maximum capacity of transmission for distance in any given link. The main purpose of the signal regenerator for differential phase signals, presented in this invention, is to mitigate the effect of these transitory responses making a greater transmission capacity possible for the same or greater transmission distance for the same or greater capacity.

It is important to mention that U.S. Pat. No. 6,323,979, describes a regenerator that uses optical phase modulation, using solutions, in a fiber optic transmission system, in which the signal is modulated by a clock. There are many differences regarding this invention, in fact, they are completely different. Note that the modulation format in number U.S. Pat. No. 6,323,979 is by phase distribution, using the sending of solutions, the phase difference between the information contained in the solution and the signal clock to synchronize the clock in the receiver. These details show that the patent is very different from ours.

DETAILED DESCRIPTION OF THE INVENTION

Figure 1A:
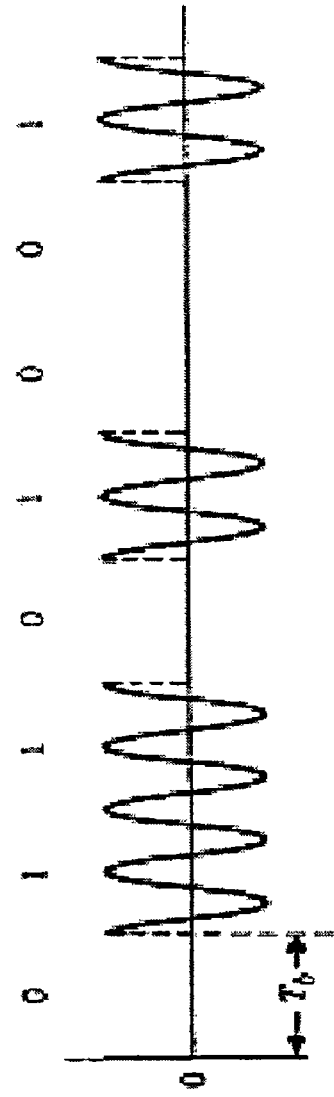
FIG. 1(a). Basic Forms of ASK Digital Transmission.
Figure 1B:
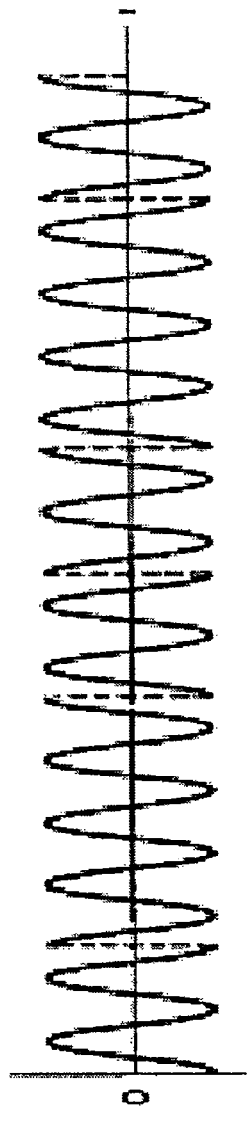
FIG. 1(b). Basic Form of PSK Digital Transmission.
Figure 1C:
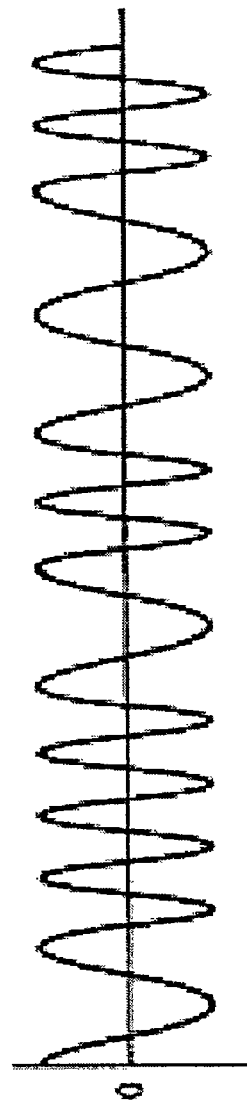
FIG. 1(c). Basic Form of FSK Digital Transmission.
Figure 2:
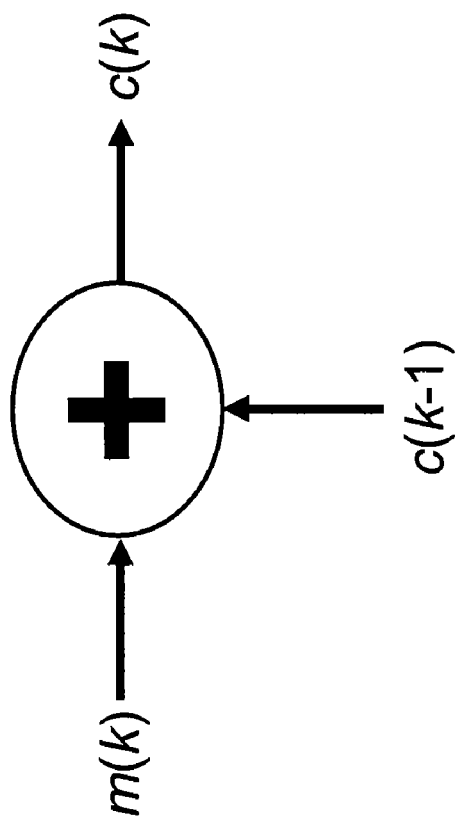
FIG. 2. DPSK Coding Scheme.
Figure 3:
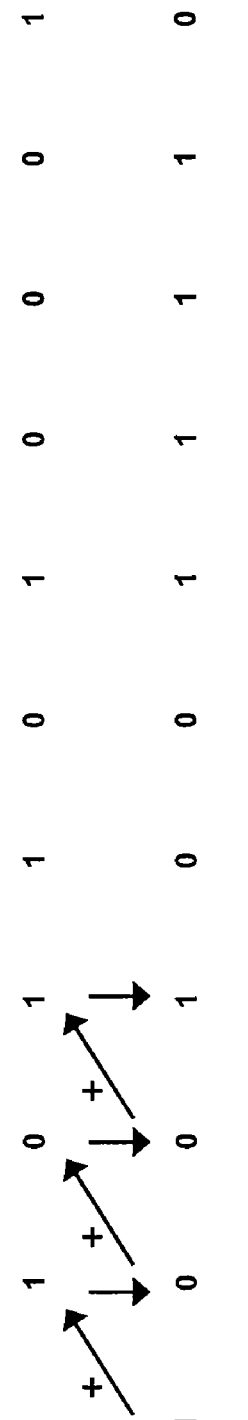
FIG. 3. Digital Example of DPSK Coding.
Figure 4:
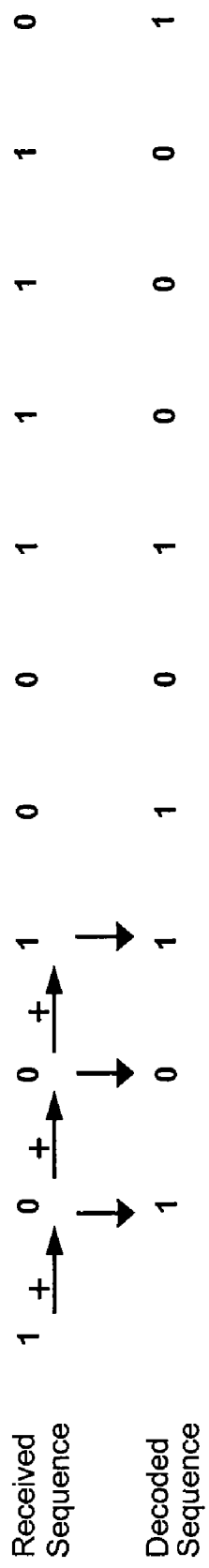
FIG. 4. Digital Example of DPSK Decoding (Sequence Received without Errors).
Figure 5:
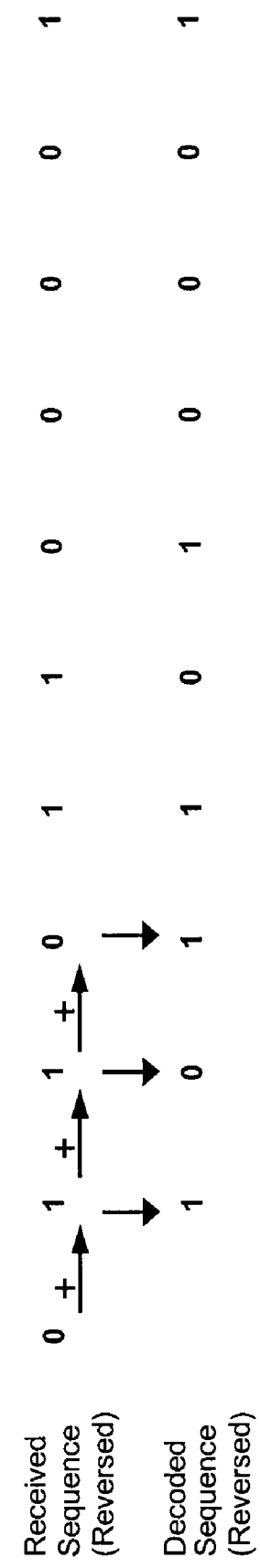
FIG. 5. Digital Example of DPSK Decoding (Sequence Received without Errors).
Figure 6:
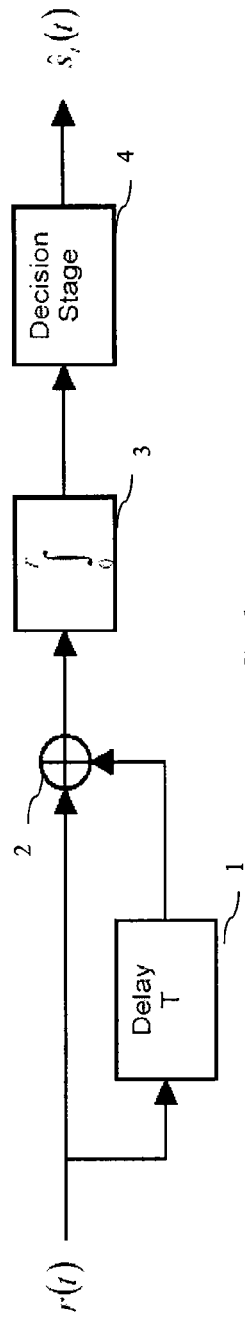
FIG. 6. Block Diagram of a Differential Detector.
Figure 7:
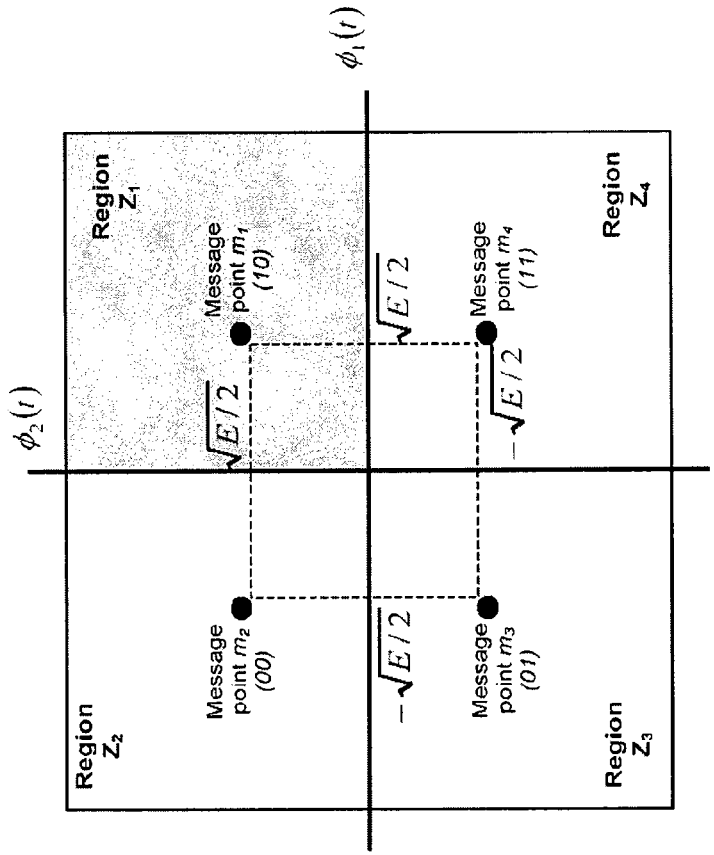
FIG. 7. Phase Diagram for a QPSK System.
Figure 8B:
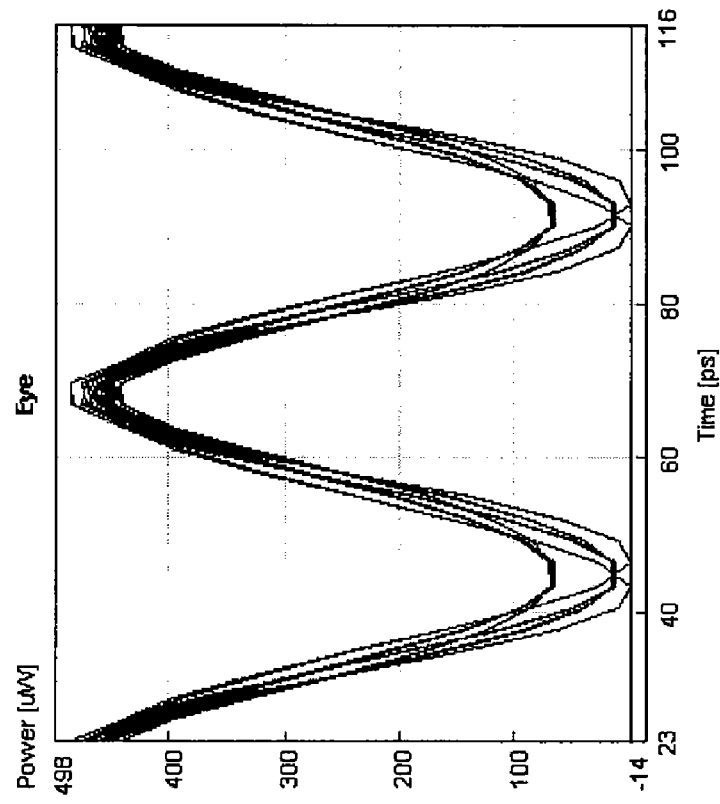
FIG. 8(b). Electrical signal received from DQPSK after being optically filtered.
Figure 8A:
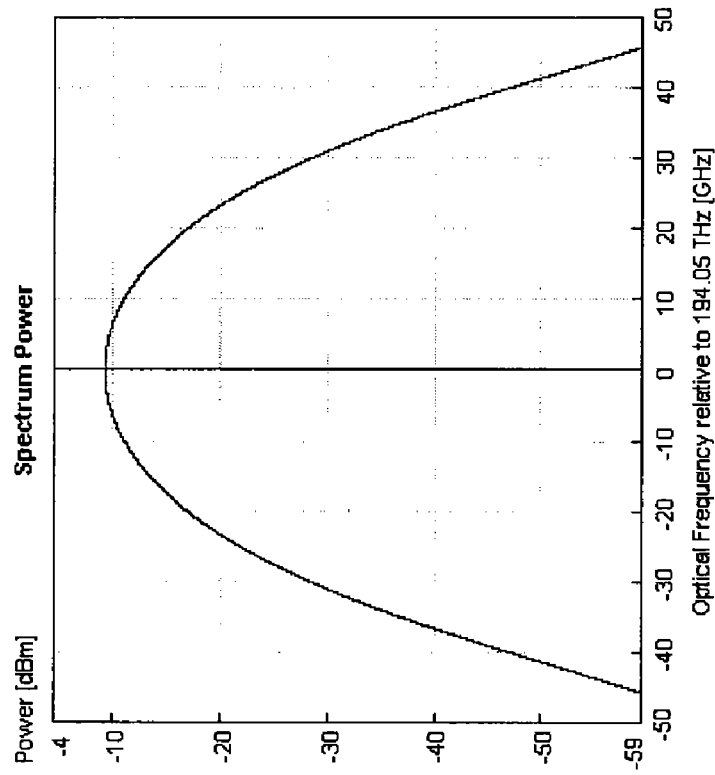
FIG. 8(a). Signal Spectrum for DQPSK.
Figure 9:
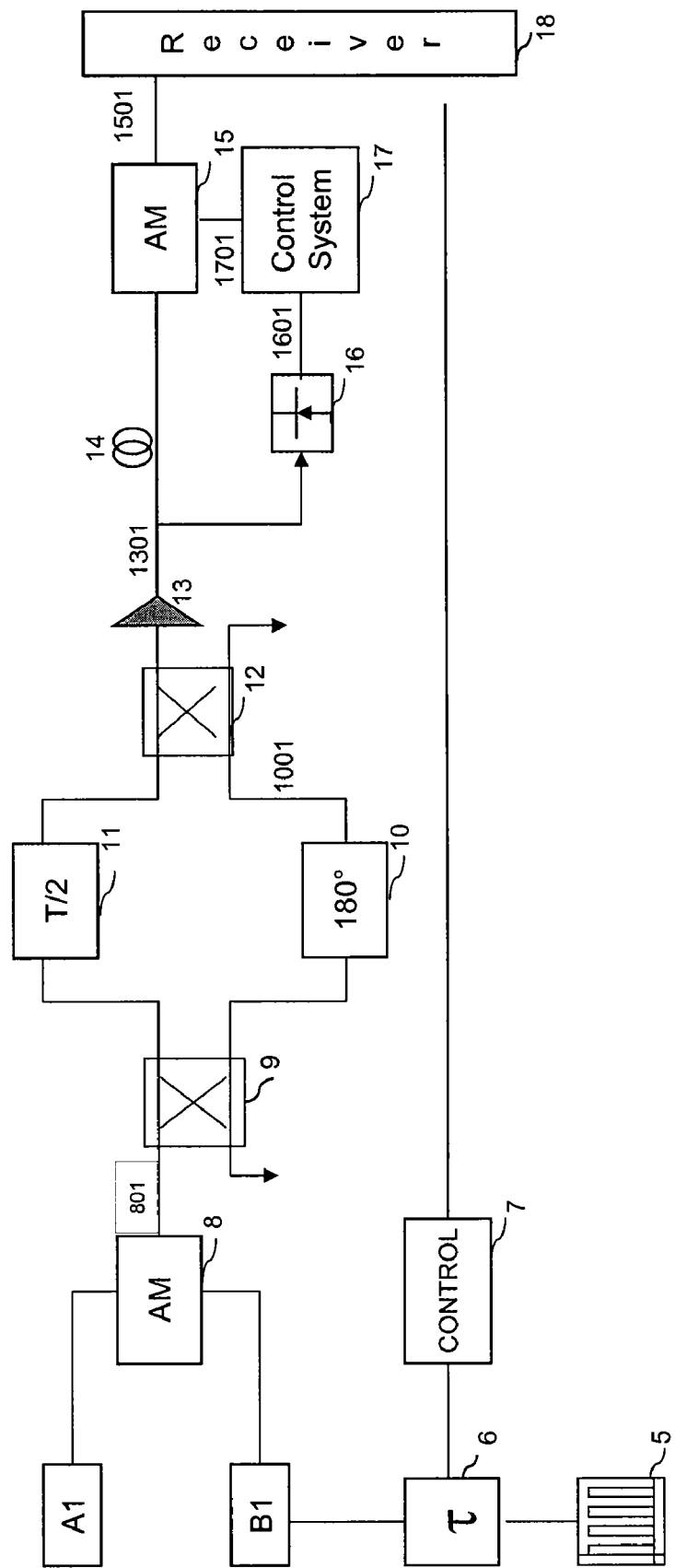
FIG. 9. Block Diagram of the optical signal regenerator for two replicas.
Figure 17:
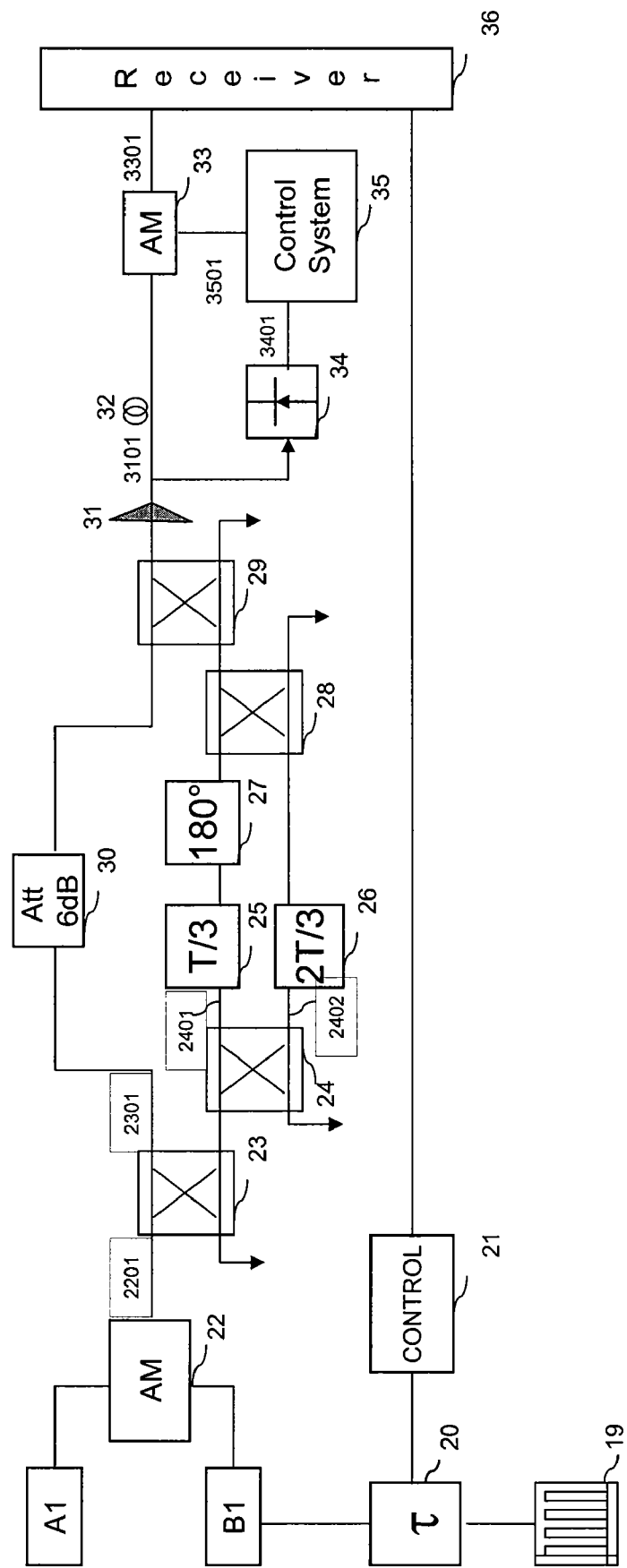
FIG. 17. Block Diagram of the optical signal regenerator for three replicas.
Figure 18:
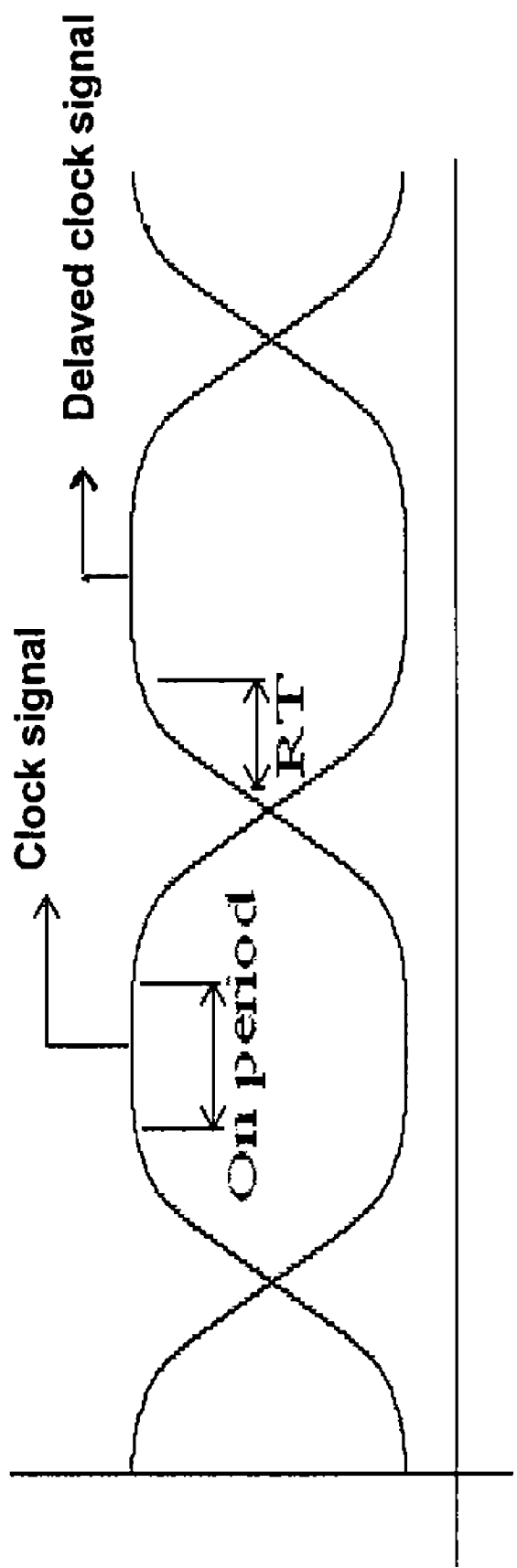
FIG. 18. Clock signals and its shifted mirror site.

The block diagram of the optical signal phase regenerator characteristic of this invention is shown in FIGS. 9 and 17, respectively.

FIG. 9 show the regenerator based on two mirror sites. The mirror sites refer to the number of identical signals that are obtained from the entry signal.

In FIG. 17, the optical signal regenerator is shown operating for three mirror sites. Afterwards, the functioning of the regenerator for three mirror sites is described in detail, which also uses operational principles similar to the regenerator of two mirror sites.

In FIG. 9, the regenerator has two inputs. The first of these is an optical signal (A1). The second is an electric control signal (B1). The electric control signal (B1) is generated when a clock signal (5) is sent to the temporary delay unit (6) which is controlled by an Electronic Control Circuit (7) so that the high clock level coincides with the maximum value of the shell and with the most stable phase value for each symbol. The Electronic Control Circuit (7) measures the quality of the signal received by the receiver (18) and sends a signal to the temporary delay unit (6).

Signals A1 and B1 enter into the Amplitude Modulator (8) and the outgoing signal (801) is sent to an optical coupler (9) that connects to a 180° signal phase shifter (10) and a half period temporary delay unit (11); the signals of each subsequently pass through an optical coupler (12) that generates two outgoing signals. One of these is directed to an optical amplifier (13), generating the outgoing signal (1301) that can follow two routes. The first of these goes through optical fiber (14) and arrives at the amplitude modulator (15); and the other route is to pass through a PIN photodetector (16) the function of which is to convert the optical signal (1301) to an electrical signal (1601), that passes through a level inverter (17) and through the amplitude modulator (15). As a result, both routes give an optical signal with differential modulation (1501) which enters the Receiver (18).

Continuing with the regenerator description in FIG. 9, we will show below the step by step process of regeneration towards two mirrors. Later on, the behavior of the regenerator will be evaluated through simulation using a very realistic optical communication system. In the results subsequently presented, the system is proven to be capable of improving reception not only for DQPSK but also for another type of phase modulation known as D8PSK.

Figure 10A:
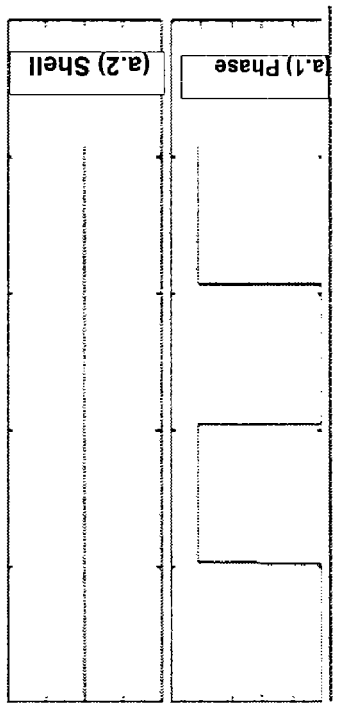
FIG. 10(a). Modulated phase signal before being optically filtered.
Figure 10B:
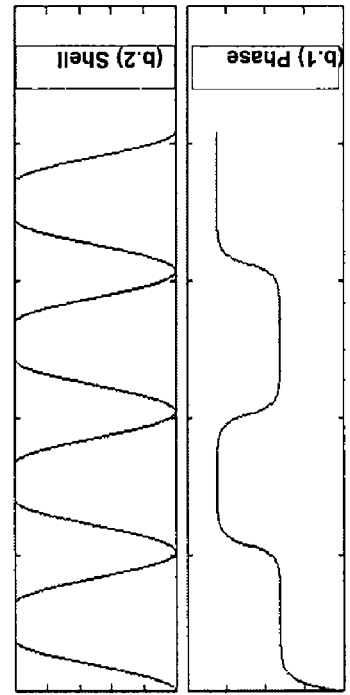
FIG. 10(b). Modulated phase signal after being optically filtered.

In FIG. 10(a), an ideal phase modulated signal with an excessively high wavelength in relation to the symbol time is shown. This Figure helps us to understand what occurs in the phase and the shell (power) of the carrier signal. On the other hand, in FIG. 10(b) the signal from FIG. 10(a) is shown but now under the effect of an optical filtration. As can be seen, the effect of the optical filtration severely damages the signal because it produces changes in the shell as well as softening the phase shifts. Optical filtration is indispensable in multichannel optical communication systems because the multiplexors and demultiplexors filter signals such as published by G. A. Castañon, et. al., in "Requirement of filter characteristics for 40 Gbit/s-based DWDM systems", in Proceedings ECOC'2001, Vol. 1, pp. 60-61. And in "Impact of Filter Dispersion Slope in NRZ, CS-RZ, IMDPSK and RZ formats on Ultra High Bit-Rate Systems", in Proceedings of European Conference on Optical Communications ECOC' 2002, Copenhagen Denmark, Sep. 8-12, 2002).

Figure 11A:
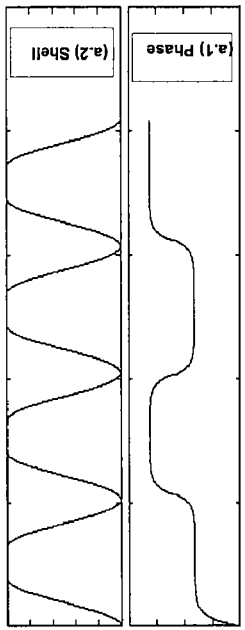
FIG. 11(a). Entry into the amplitude modulator, optical signal.
Figure 11A:
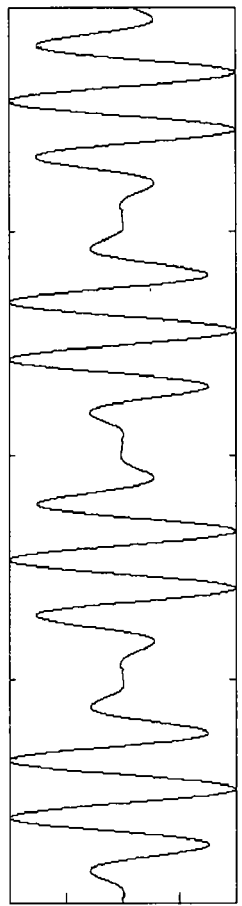
Figure 11B:
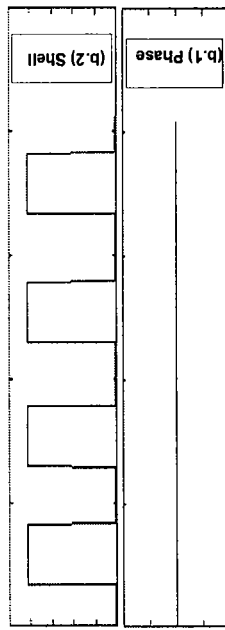
FIG. 11(b). Entry into the amplitude modulator, clock signal.
Figure 11B:
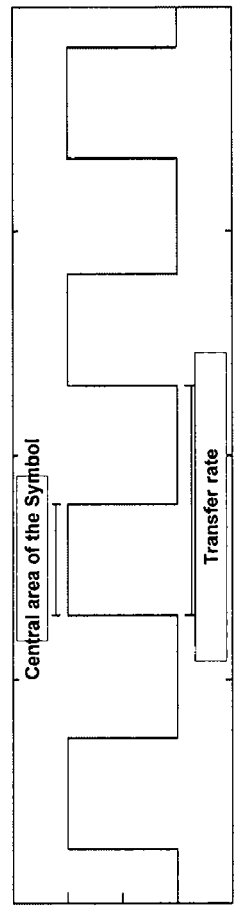

It is important to mention that the regenerator shown in FIG. 9 must be situated after the communication system's multiplexor and before the optical signal decoders. The signal (A1) is introduced to the regenerator as indicated in FIG. 9 and this signal is obtained from the multiplexor from a multichannel optical system. This signal (A1) is introduced to an amplitude modulator (8) controlled by a clock signal (5) with T/2 duration. It should be mentioned that T is the symbol period. To obtain the desired result, the clock incoming to the amplitude modulator (8) needs to be synchronized with the optical signal (A1) so that the high clock level interval matches the center of the symbol exactly as shown in FIG. 11(a) where the incoming signal to the regenerator, and the falls in the level of the shell can be seen, and softening of the signal phase. In FIG. 11(b) the clock signal is shown in which it can be seen that the high level matches the less damaged sections of FIG. 11(a). If we observe the shell/signal phase representation, the high clock level can be seen to coincide with the maximum value of the shell and with the most stable value of the phase for each symbol.

Figure 11C:
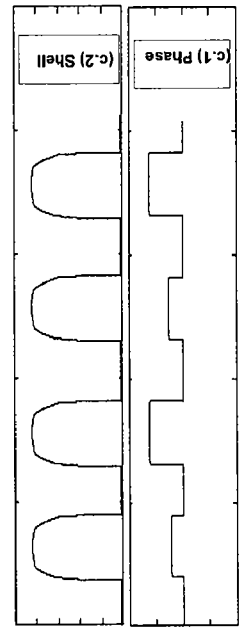
FIG. 11(c). Outgoing signal of the amplitude modulator.
Figure 11C:
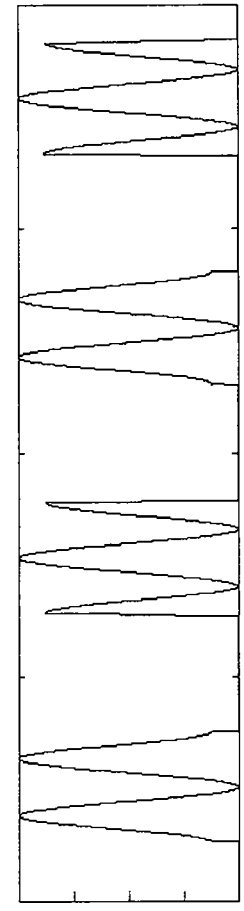

FIG. 11(c) shows the outgoing signal of the amplitude modulator. It can be observed that the shell still shows abrupt shifts and it can also be seen that we have quite abrupt shifts in the signal phase with a clear differentiation of the signal phase level. In this way, the transitory responses caused by the filtration have been removed leaving only those intervals where the optical signal shows a more stable behavior. This is the type of output that is obtained after the amplitude modulator indicated by the rate (801) in FIG. 9.

Figure 12:
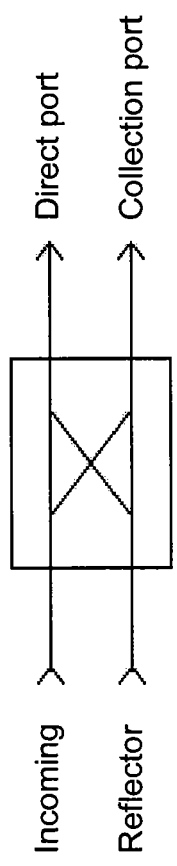
FIG. 12. Definition of the ports of an optical coupler.

Once the optical signal interval has been obtained where the information is less damaged, FIG. 11(c). The signal that leaves the amplitude modulator (801) is mirrored by an optical coupler (9) of two outputs as can be seen in FIG. 12. If we cancel the entrance into the incoming port called reflector, in each of the outlets there is a copy of the incoming signal. In the direct port, defined in FIG. 12, an identical phase signal is obtained but is 3 dBs lower in power with respect to the incoming power. In the coupler port, besides having a loss of 3 dBs, an additional phase difference of 90° with respect to the incoming signal is obtained.

Figure 13A:
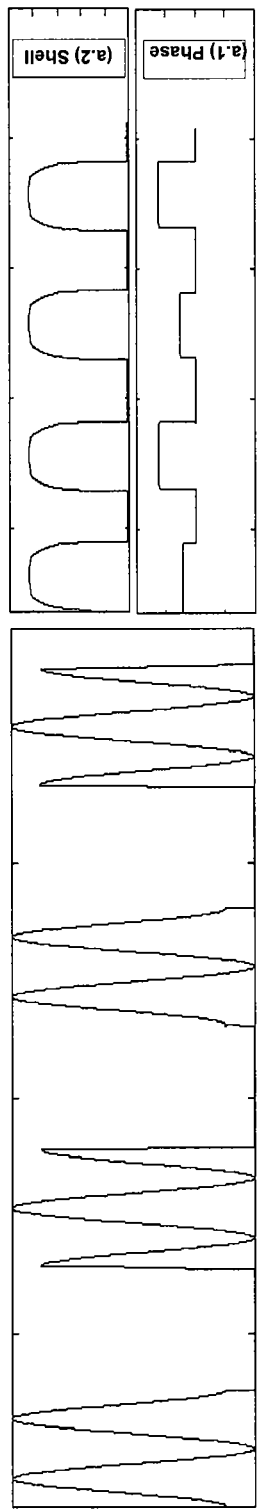
FIG. 13(a). Outgoing signals of the amplitude modulator: signal with a phase difference of 180 degrees.
Figure 13B:
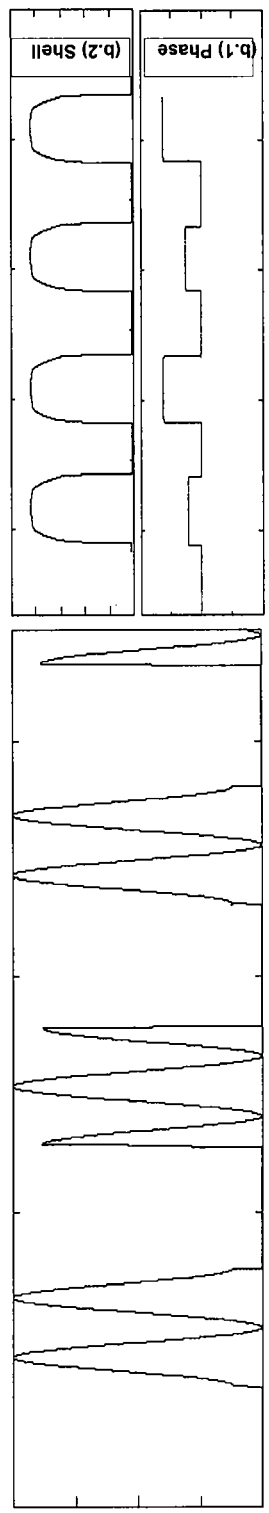
FIG. 13(b). Outgoing signals of the amplitude modulator, delayed T/2 mirror site.
Figure 13C:
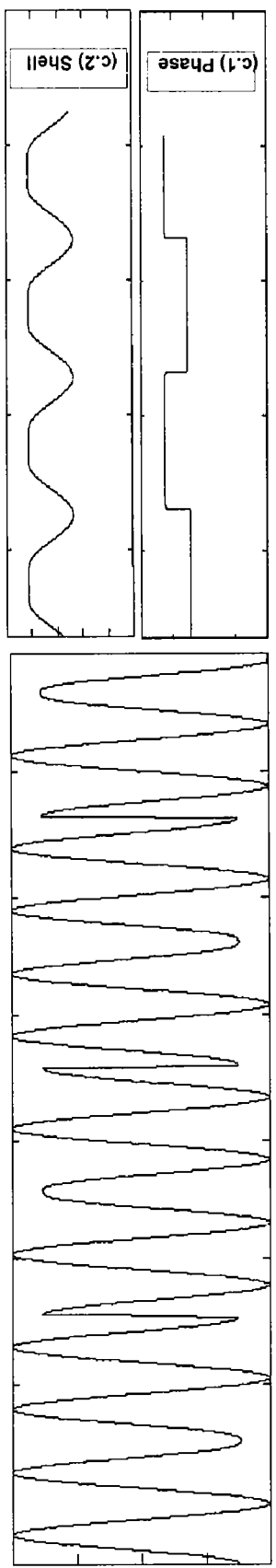
FIG. 13(c). Outgoing signal of the amplitude modulator, sum of both signals.

Each of the mirror sites are processed separately in FIG. 9. The signal obtained in the direct port must be shifted to a time equivalent to an average symbol period, i.e., it is delayed T/2 (11), so that the original signal is completed when the two mirror sites come together in the optical coupler (12). The other signal that leaves the coupler port, must be phase shifted 180° (10) to compensate for the phase shifts introduced by the first coupler as well as by the second. Each of these introduces a 90° phase difference which means that the total phase difference should be 180°. Finally both processed signals are introduced into the coupler entrances (12) to obtain the complete period in the direct port of the second coupler. The second coupler (12) adds the two incoming signals together. The two signals produced by the first coupler (9) are shown in FIG. 13(*a*) and FIG. 13(*b*). Note that the signal in FIG. 13(*b*) shows a delay of T/2. FIG. 13(*a*) shows the signal with a phase difference of 180°, and FIG. 13(*c*) shows the sum of the two signals and this sum is produced by the second coupler (12). One can see that the signal phase may be perfectly regenerated but even the shell shows transitory responses. This is the signal obtained from the output of the second optical coupler.

To remove the effect of the transitory responses of the shell (power transitory responses), a power control is performed that maintains a constant level of the shell at the output. Keeping in mind the difficulty of implementing optical amplifiers of variable gain, a system is used that is based on variable attenuation and signal sections with excessively high power are attenuated more than those with a lower power.

Below the control signal is described for the variable attenuator followed by FIG. 9.

Figure 14A:
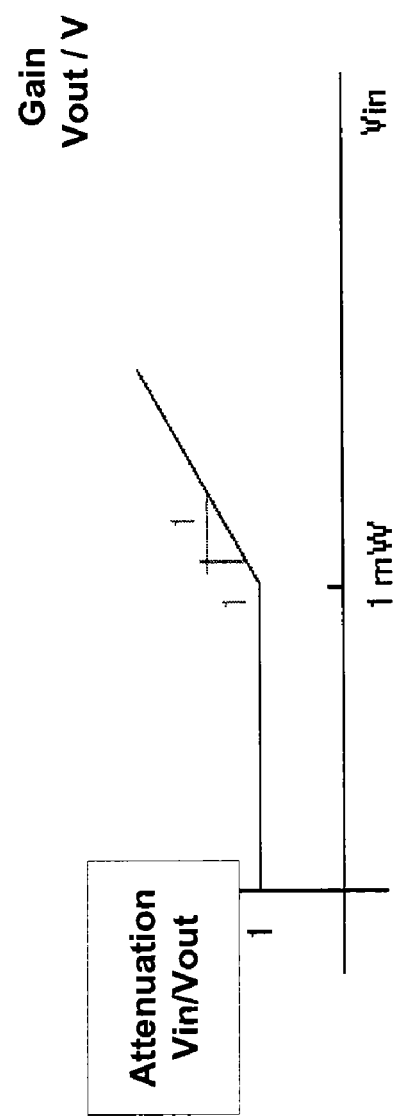
FIG. 14(a). Response from the control system: attenuation
FIG. 14(b). Response from the control system: gain
FIG. 14(c). Output voltage (Vout) vs Input Voltage (Vin).
Figure 14B:
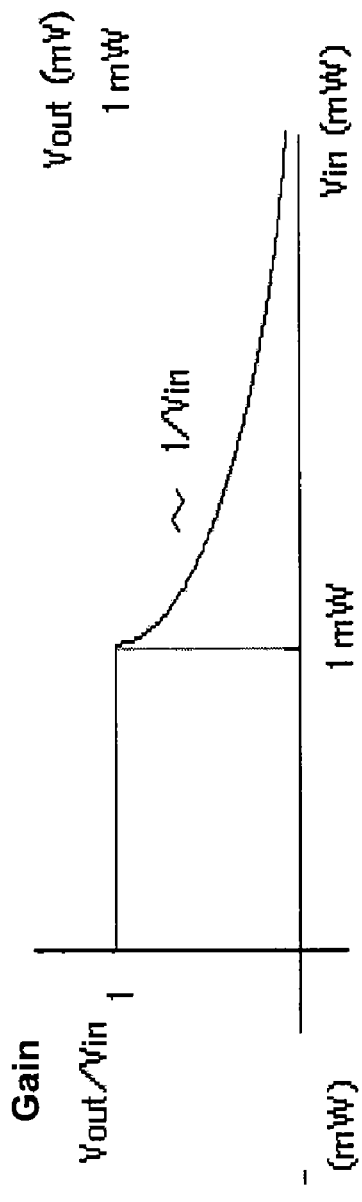
Figure 14C:
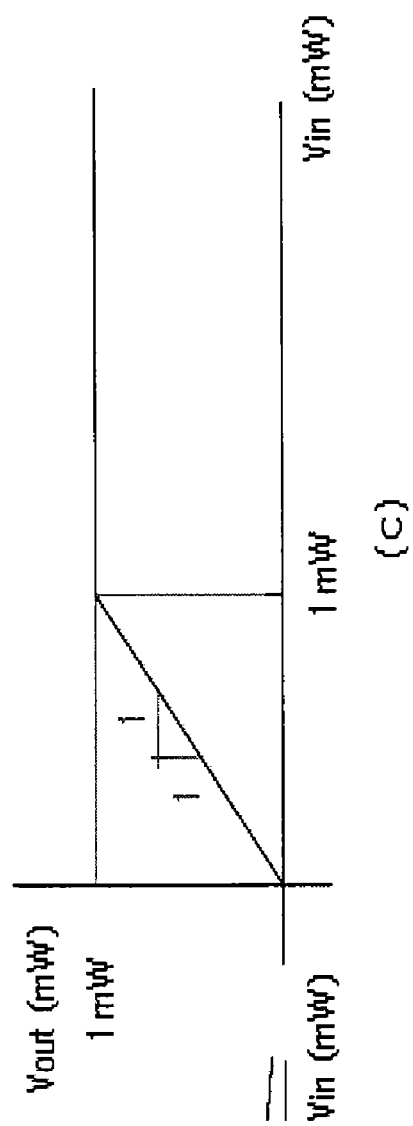
Figure 15A:
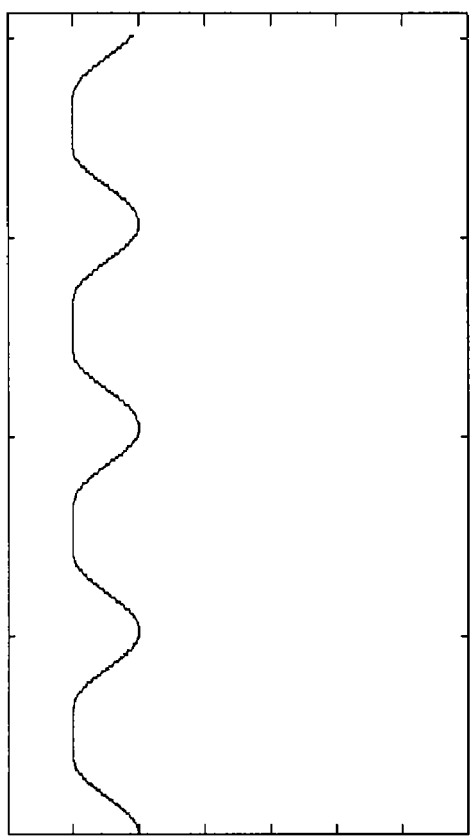
FIG. 15(a). Signals to the output of the photodetector.
Figure 15B:
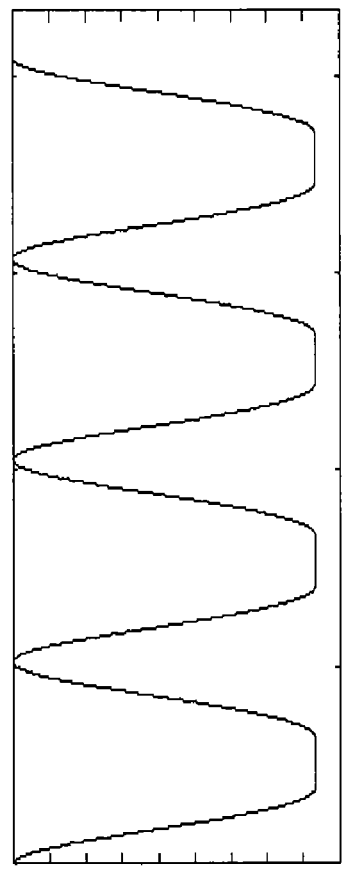
FIG. 15(b). Signals to the output of the control system.

To carry out the above, in first place we must amplify the signal to ensure that the level of the shell is greater than the level required at the output including the minimums of the shell. To increase the level of power, an erbium doped optical amplifier (13) is used. After amplifying the optical signal it is divided into two and one of the exits of the optical divider is connected to a photodetector (16). The photodetector (16) will give an electrical signal proportional to the shell of the optical signal at the entrance, as shown in FIG. 15(*a*). This electrical signal is processed to obtain the signal to be introduced to the modulator of the corresponding amplitude. The control system (17) is made up of an element of scale and a limited level inverter (1/x) so that the low powers do not cause excessively high spikes. The curves in FIG. 14(*a*), FIG. 14(*b*), and FIG. 14(*c*); the behavior of the control system is defined according to the outgoing voltage of the photodetector [SIC]. FIG. 14(*a*) shows the attenuation. FIG. 14(*b*) shows the gain curve, and FIG. 14(*c*) shows the outgoing voltage (Vout) versus the incoming voltage (Vin). This level inverter is responsible for the control system (17) presenting the curves described in FIG. 15(*b*). Keeping in mind that the amplitude modulator (15) in FIG. 9) is a passive element the control signal cannot exceed the unit value. For this reason the inverter must be limited to ensure that an excessive value is not produced. To compensate for the delay produced in the control system (17), a section of optical fiber (14) is introduced which works to delay the electronic processing time signal so that the control and optical signal are synchronized in the second amplitude modulator (15).

As can be seen in FIG. 15(*a*), the outgoing signal from the photodetector (16) corresponds to the optical signal shell in which the signal variation can be appreciated. The control signal obtained from this, FIG. 15(*b*), shows that for the lowest levels of power, the control signal has the maximum value which means a minimum attenuation while for elevated power levels, the control signal is minimum, which means a greater attenuation.

The resulting signal (1701) will be injected into the electrical input of the respective amplitude modulator (15) in FIG. 9 so that the average outgoing power from the optical signal will be uniform. Obtaining as a result, the signal shown in FIG. 16.

Figure 16:
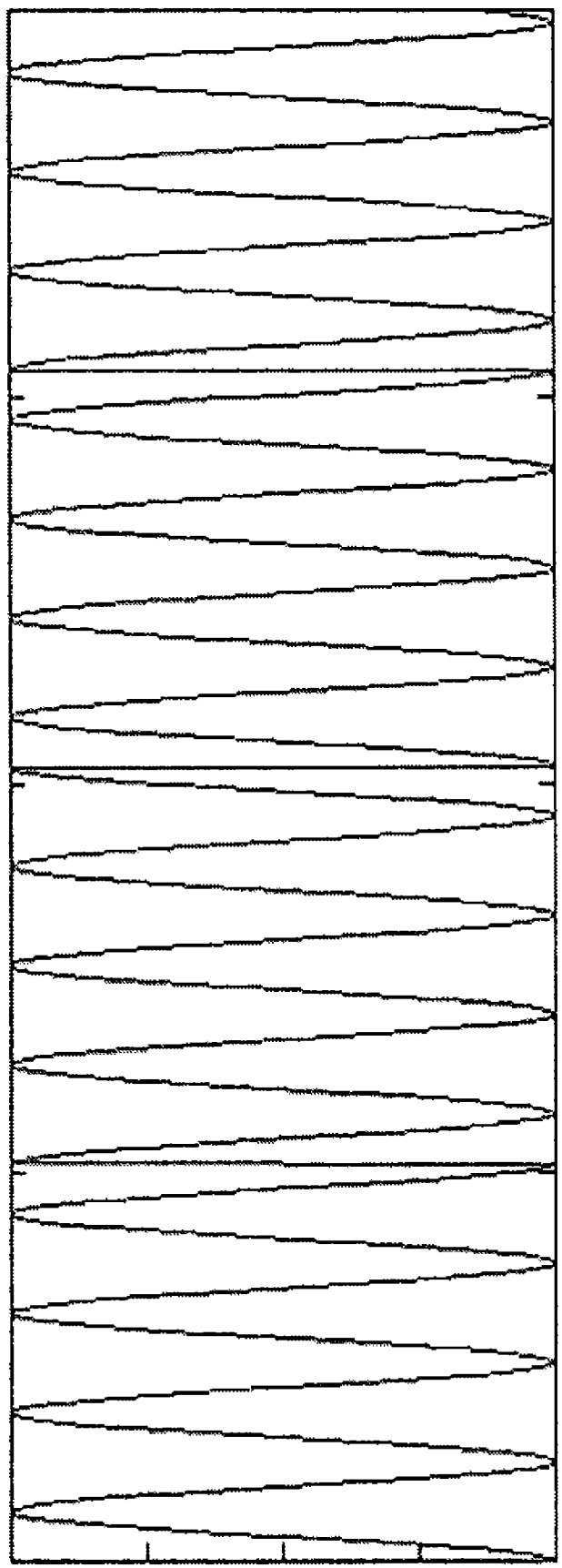
FIG. 16. Outgoing signal of the regenerator system.

The outgoing signal from the regenerator system, (FIG. 16), shows a signal that is practically identical to the incoming signal to the optical communication system, as shown in FIG. 10(*a*). As can be seen in FIG. 16, the outgoing signal of the regenerator is very good, however, problems not considered should be kept in mind. Certain situations that are not ideal, such as non-ideal overlapping of the mirrors or certain power losses, may make the behavior of the regenerator imperfect and reconstruction may not be good. However, in general terms, the regenerator improves the incoming signal. To show the operational limits, results obtained through a specialized optical communication simulator are given below.

The architecture of a regenerator with three mirrors is described below:

In the paragraph above, an ideal phase regenerator based on two mirror sites was presented. Nevertheless, one might think about generalizing the system for a greater number of mirror sites like the regenerator shown in FIG. 17.

The regenerator's operational principle based on three mirror sites is slightly different than the one with two mirror sites explained above.

This regenerator has three mirror sites (the same as the one with two mirror sites), it has two inputs. The first of these is an optical signal (A1) and the second is an electric control signal called (B1).

The electric control signal (B1) is generated when a clock signal (19) is sent to the temporary delay unit (20) which is controlled by an Electronic Control Circuit (21) so that the high clock level coincides with the maximum value of the shell and with the most stable phase value for each symbol. The Electronic Control Circuit (21) measures the quality of the signal received by the receiver (36) and sends a signal to the temporary delay unit (20).

The signals A1 and B1, enter the amplitude modulator (22) and is modulated by a clock signal (19) the duration of which is T/3. Period T is the period of a symbol. What the amplitude modulator does is to take a third of the signal symbol. Like the case of the regenerator with two mirror sites, what is taken from the incoming signal is the central part of a symbol where the phase information of the symbol is less damaged.

The mirror site or the copy of the signal (2201) generated by the amplitude modulator is sent to the first optical coupler (23) which produces two mirror sites. The first mirror site is sent at the same time to a second coupler (24) which generates a third mirror site plus letting a second incoming mirror site pass through. Afterwards, the signal reconstruction is made through two couplers (28 and 29) in cascade as can be seen in FIG. 17.

In order to reconstruct the outgoing signal correctly the three mirror sites are added together where: the signal (2301) of the first mirror site is not delayed; the second mirror site (2401) is delayed by one third (25) of the symbol period; the third mirror site (2402) is delayed two thirds (26) of a period. Also, the first mirror site (2301) has no phase difference due to the fact that it crosses two couplers (23 and 29) and in neither of them is a phase difference produced, due to the fact that both enter through the incoming port and leave by the direct port. The second mirror site (2401) crosses four couplers (23, 24, 28, and 29) and for this reason has a loss of 12 dBs (3 dBs for each coupler) and for the configuration used only two of them has a phase shift of 90° (23 and 29), i.e., a total phase shift of 180° (27) is required to compensate for the phase shift introduced by the couplers (23 and 29). The third of the signals (2402) also crosses the four couplers (23, 24, 28, and 29) and it suffers a 12 dB loss. However, in this case the four couplers introduce a phase difference of 90° each producing a total phase difference of 360° and, therefore, the signal will not need to be compensated with an extra phase difference. The second as well as the third mirror site cross four couplers while the first only crosses two. This implies that the first of the mirror sites suffers a loss that is 6 dBs less than the other two. For this reason 6 dBs should be attenuated as shown in element (30) so that the three signals have the same level of power when leaving the couplers.

For the two mirror sites as well as the three mirror sites, the combination process of the mirror sites may be problematic due to the fact that you cannot be sure that a whole number of the optical signal periods will be replicated. However, this will have no effect on the exit since differential modulation is being used, the resulting signal is obtained from the phase difference between two symbols. [SIC] Lack of continuity in the phase, produced by the combination of the couplers' mirror sites of one symbol is compensated with the lack of continuity of the subsequent symbol.

Clock Signal

Even though [SIC] the clock signal (19) in FIG. 17, we can understand how a line of rectangular pulses, for sufficiently high transmission rates that must take into consideration the effects due to the fact that the slope of finite ascent of the amplitude modulator. To compensate for the effect of the finite ascending and descending slope the mirrors must overlap. The following Table 1 shows the ascending time of the amplitude modulators of the regenerators presented. These ascending times may be relatively easily achieved by commercial amplitude modulators. The table shows the ideal case and also the ascending time required so that the regenerators presented function perfectly. The ascending and descending time required is 3 picoseconds, in the cases presented of two and three mirror sites.

TABLE 1

Clock signal parameters to be used.

| | Two mirror sites | Three mirror sites |
| --- | --- | --- |
| Ideal high level time | 50% | 33.3% |
| Rise time used | 3e-12 | 3e-12 |
| High level time | 50 · 0.92% | 33.3 · 0.90% |

Synchronization of the clock signal for 2 and 3 mirror sites.

Figure 19:
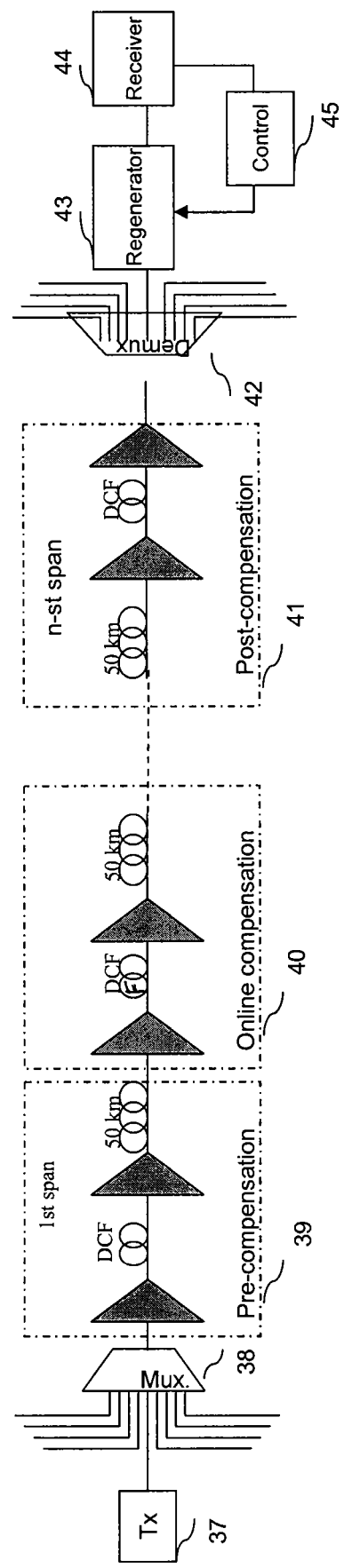
FIG. 19. Fiber optic channel scheme used.

Synchronization of the clock signal with the information signal from the symbol period in the optical carrier is implemented through an Electronic Control Circuit (21) in FIGS. 19 and (7) in FIG. 9, that depending on the optical signal (A1) controls the instant when the clock signal pulses begin. This is not a synchronization with the optical phase signal as would be done in a coherent detection system, but a synchronization of the clock signal with the T symbol period that contains the phase information. What you want to do is take T/2 (in the case of two mirror sites) from the information in the center part of the symbol. This central part of the symbol is the part where the phase information of the symbol is less damaged. It is important to consider that the regenerator is found in the end part of an optical communication system, i.e., before the demodulators and the detectors. From the signal received in the detectors, the clock may be extracted electronically from the signal and this clock may be fed back to the first amplitude modulator of the regenerator so that it takes samples of T/2 from each symbol. The same may be done with the second regenerator option, from this invention, that is the one with three mirror sites. As can be seen in FIGS. 9 and 17, the temporary delay unit is controlled by an Electronic Control Circuit (7) and (21) respectively that measures the quality of the signal received in the receiver (18) and (36) and sends a signal to the temporary delay unit of the clock signal so that the high clock level coincides with the maximum value of the shell and with the most stable phase value for each symbol.

Results from the Phase Regenerator for Phase Shift Differential Modulation Formats The optical transmission system used in the simulations is presented in FIG. 19 in which the different transmission sections are shown divided by the optical amplifiers. To test the system's operation, twelve sections were used involving a total transmission distance of 600 km.

As is known, one of the main effects that limit an optical transmission system is chromatic dispersion. That is to say, we must minimize the residual dispersion to be able to obtain higher transmission rates. To reduce residual dispersion, dispersion compensation schemes are applied for the purpose of making the residual dispersion or dispersion at the end of the transmission system be at its lowest level possible.

Figure 20:
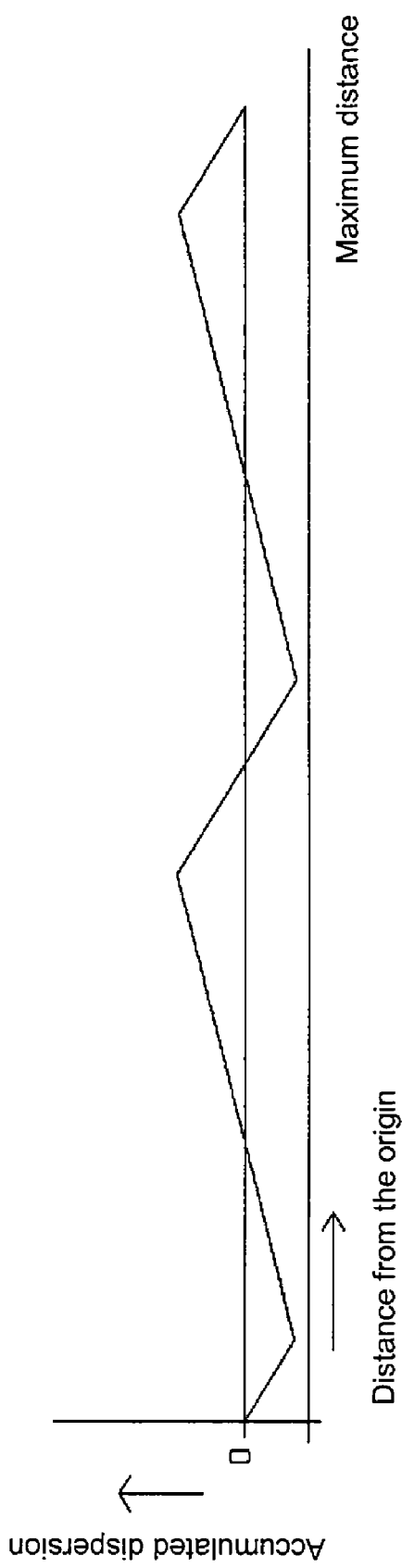
FIG. 20. Dispersion map of the optical communication system.

To compensate for chromatic dispersion, what is proposed is to use the pre-compensation (39), online compensation (40), and post-compensation (41) strategy. For the pre-composition stage, we compensate for 30% of the dispersion from a monomode fiber section at the beginning and the remaining 70% at the end of the post-compensation stage. The online compensation sections compensate for 100% of the dispersion from the monomode fiber. FIG. 20 shows the dispersion map strategy used in this invention. As can be seen in the Figure, the purpose of this dispersion map is to make the residual dispersion zero at the end.

Figure 21:
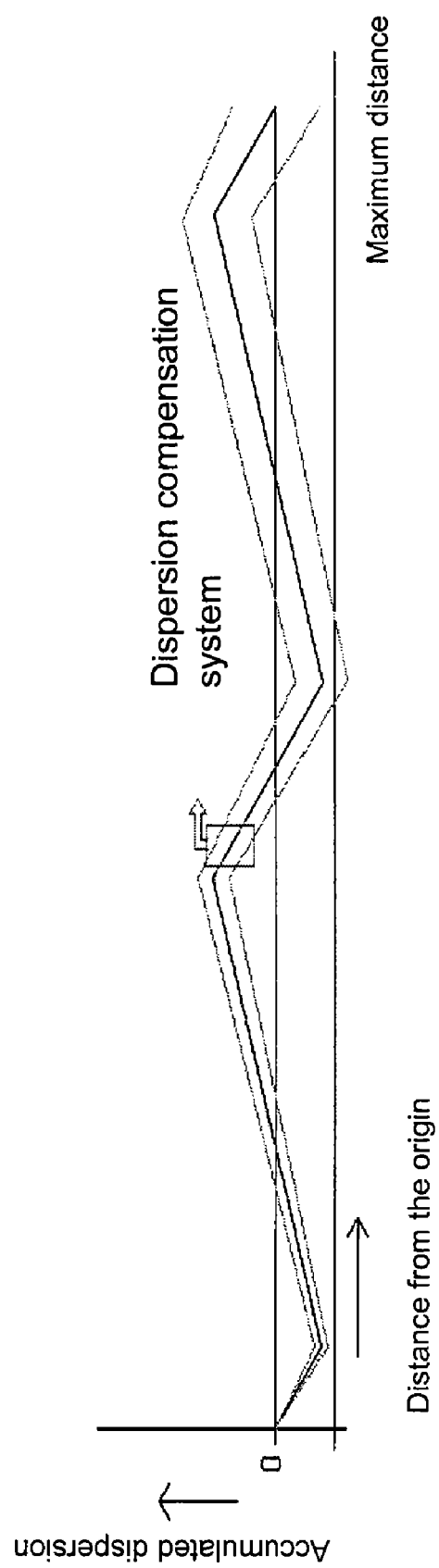
FIG. 21. Accumulated dispersion for various channels.

This dispersion compensation scheme has been widely used by different technologies, however, it only cancels dispersion for the central channel. The channels that are found at the ends of a multi-channel system see a non-null dispersion. The dispersion is greater when the distance is greater (in frequency) to the central channel and also the dispersion is greater when the transmission distance is greater, as is shown in FIG. 21. In FIG. 21, the residual or accumulated dispersion for different channels on the same optical fiber. The central curve corresponds to the central channel and the remaining ones correspond to the channels on the ends.

There are several strategies to resolve this problem with residual dispersion for channels that are far from the central frequency in a multi-channel communication system. One solution for high speed systems is to used variable dispersion compensation per channel for the channels affected. This scheme adds more cost to the transmission system and one must try to avoid this, however, there are cases in which it is necessary to implement them.

Fibers Used

The fibers used are shown in Table 2. There is information on the monomode transmission fiber and also on the compensation fiber.

TABLE 2

Basic parameters of the fibers used

| | Non-null dispersion monomode fiber | Dispersion compensation fiber |
| --- | --- | --- |
| Attenuation (dB/km) | 2 | 5 |
| D (s/m$^2$) | 8.00E-06 | -9.00E-05 |
| S (s/m$^3$) | 6.00E+01 | -6.50E+02 |
| Aeff (m$^2$) | 6.50E-11 | 1.93E-11 |
| Nlcoef (m$^2$/W) | 2.60E-20 | 4.30E-20 |

Channel Band Width and Separation Between the Channels

To prove the feasibility of this invention we have used nine transmission channels at the transmission frequencies recommended by the ITU. The separation between channels that we used was 50 GHz. The optical filters that we used in the simulations for the multiplexors and demultiplexors have a Gaussian function of the third order. The bandwidth of these filters was optimized for the different modulation formats used and we made sure the filters did not produce any interference between channels greater than 25 dBm. In other words, the filters' bandwidth sought had to first comply with the separation between the channels and also that the optical filter would be sufficiently narrow so that it would not produce significant interference in the adjacent channels.

Figure 22A:
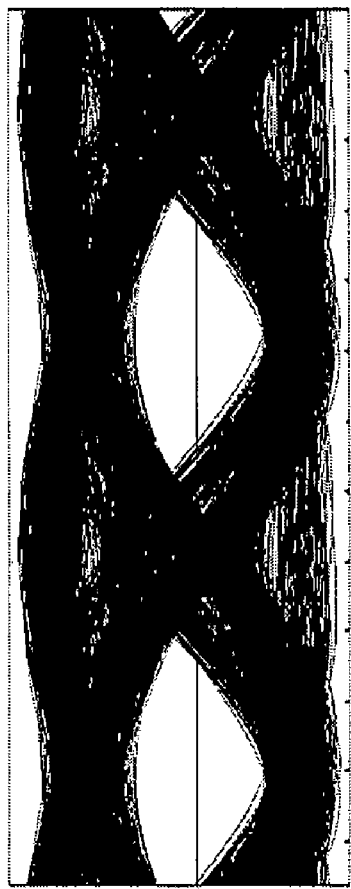
FIG. 22(a). DQPSK signal eye without regeneration.
Figure 22B:
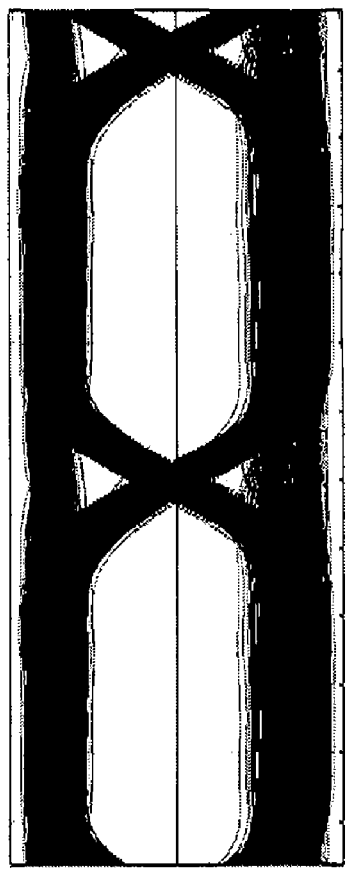
FIG. 22(b). DQPSK signal eye with regeneration.

FIG. 22(a) and FIG. 22(b), show results from the opening of the eye signal for the DQPSK modulation format. The bitrate used was 66 Gbit/s. The separation between channels is 50 GHz and then the system has a spectral efficiency of 1.2 bit(s) Hz. The filters used in the simulation for the multiplexors and demultiplexors had a Gaussian transfer function of the third order and a band width of 32 GHZ to 3 dB with respect to the peak. FIG. 22(a) is the opening of the eye signal without the regenerator and FIG. 22(b) is the opening of the eye signal with the regenerator operating. Note that the eye opening when the regenerator is used is better compared to the opening of the eye when the regenerator is not used. To obtain these results a transmission distance of 600 km was used. The power injected into the transmission fiber is 2 dBm and the power injected into the dispersion compensator fiber is −5 dBm. A pseudo-andom sequence of 231 bits was used in the simulation. It was also proven that the outgoing signal of the decoders was equal to the incoming signals.

Figure 23B:
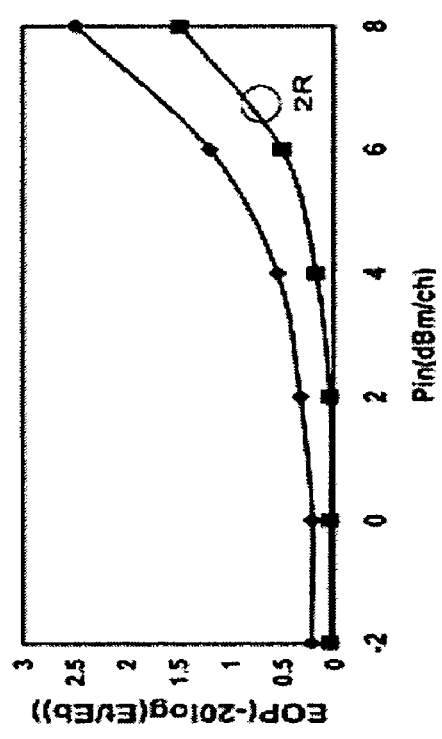
FIG. 23(b). EOP results versus residual dispersion.
Figure 23D:
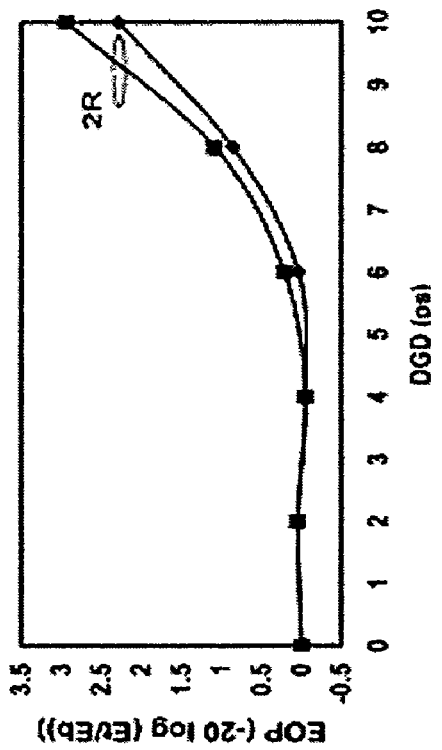
FIG. 23(d). EOP results versus transmission power.
Figure 23A:
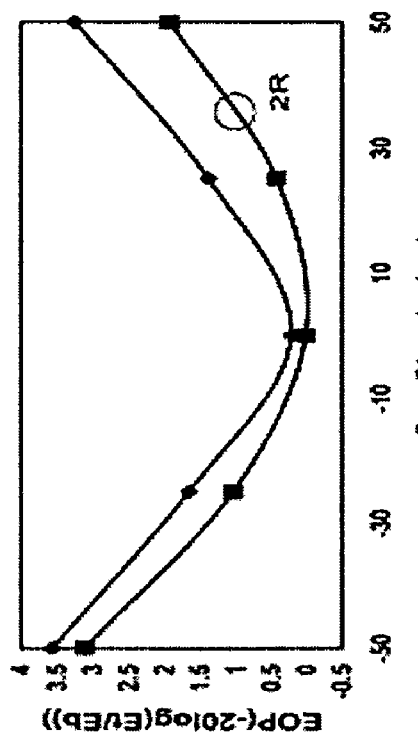
FIG. 23(a). DQPSK results, Q factor versus OSNR.

FIG. 23(a) shows the results of the Q factor versus the Optical Signal to Noise Ratio parameter (Optical Signal to Noise Ratio OSNR) of the system with regeneration and without regeneration when white noise is added to the system coming from the erbium dopped optical amplifiers (Erbium Dopped Fiber Amplifiers). The transmission distance is 600 km. To obtain different values for the optical signal to noise ratio what was done was to shift the noise figure factor of the last amplifier. Changing this noise figure factor makes it possible to control the amount of white noise that the amplifier generates and therefore to vary the parameter of the optical signal to noise ratio OSNR. Factor Q is calculated using the following equation $Q[dB]=20 \log [(\Box_1-\Box_0)/\Box_1+\Box_0]$ where $\Box_1$ and $\Box_0$ are the average voltages for 1's and 0's, also $\Box_1$ and $\Box_0$ are the standard deviations of the voltages of 1's and 0's, respectively. FIGS. 23(a), 23(b), 23(c), and 23(d) show results when the regenerator is used and when it is not used, indicated with a 2R. The reason for using a 2R is due to the fact that the regenerator presented in this invention performs two types of regeneration. The first is that the signal phase is regenerated, and the second regeneration is that the duration of the symbol where the signal contains the same phase is also regenerated. Note that the results, from factor Q using the regenerator, are 2 dB greater with respect to the results when the regenerator is not used. This improvement in the function is one of the principal advantages of the use of the phase regenerator. The regenerator presented an improvement in the signal even when the noise of the optical amplifiers is high.

Figure 23C:
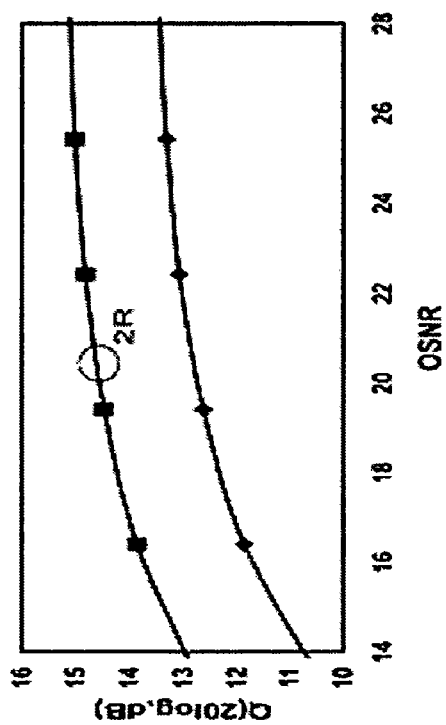
FIG. 23(c). EOP results versus differential group delay.

Another parameter which is important to evaluate is the impact of the chromatic dispersion. It is very important that the modulation format be tolerant of the chromatic dispersion introduced by the optic fiber and the optic filters of the multiplexors and the demultiplexors of a communication system. FIG. 23(a) to FIG. 23(c) show the results of the DQPSK modulation format of the central channel of a nine channel system after a transmission distance of 600 km on the nine channels. The power used for the transmission monomode fiber is 2 dBm. If for example, a tolerance of 0.5 dB is assumed as the limit for the residual dispersion, then when the regenerator is used, the residual tolerance is 50 ps/nm. It should be mentioned that the eye opening penalty (Eye Opening Penalty by its acronym in English) is defined as EOP=−20 log(Et/Eb). Where Et is the eye-opening penalty in the destination and Eb is the eye-opening penalty in the origin of the transmission. FIG. 23(c) sows the results of the dispersion by polarization mode. The results are presented in function of the differential group delay. To obtain these results the case is considered where the light of the signal is divided equally among the two principle polarization states in the optical fiber. In FIG. 23(d) the eye-opening penalty is presented versus the transmission power to analyze the non-linear effects. As is known, the non-linear effects increase with the transmission power that is used in the optical system channels. The eye-opening penalty shown is for the central channel of a nine channel system. To obtain these results a transmission distance of 600 km was considered. The results include the non-linear effects known as self-phase modulation, cross phase modulation, and four mixed wavelengths. To obtain results from the residual dispersion effects, polarization mode dispersion, and isolated non-linear effects, the white noise from the amplifiers was suppressed in order to obtain these results.

Figure 24A:
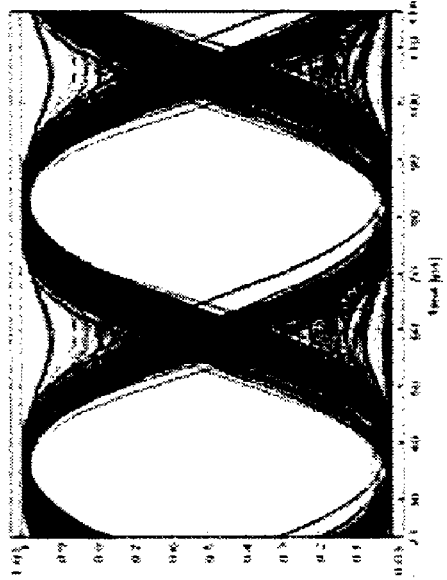
FIG. 24(a). D8PSK signal eye after the transmitter, i.e., 0 km.
Figure 24B:
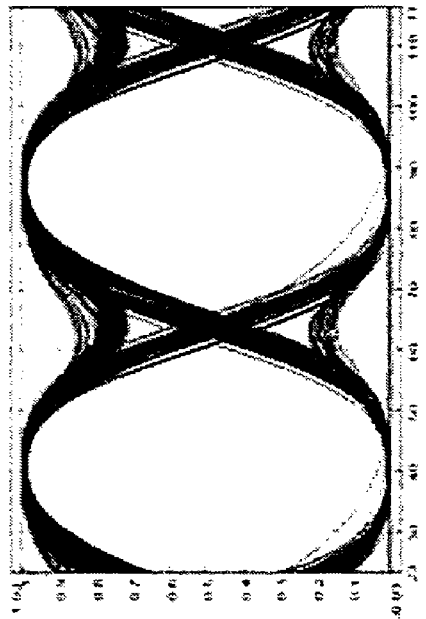
FIG. 24(b). D8PSK signal eye with regeneration at 400 km.
Figure 24C:
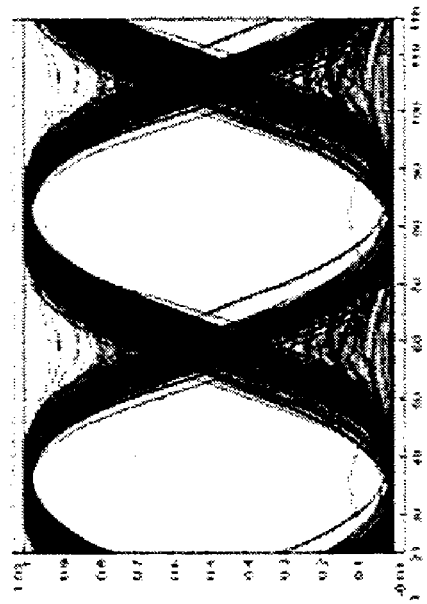
FIG. 24(c). D8PSK signal eye with regeneration at 600 km.

FIGS. 24(a), 24(b), and 24(c) show the results of the D8PSK modulation format. Note that this is a format that is different from the DQPSK. In D8PSK 3 bits of information are transmitted per symbol. For example, if we consider that the symbol rate is 21.5 GHz then the bitrate is 3×21.5=64.5 Gbit/s. D8PSK is a very recent modulation format. One of the advantages of this format is that it can transmit more bits of information per symbol, however, this merits 8 possible phase shifts. When there are fewer levels for the phase, the non-linear effects of the transmission system affect this modulation format with greater impact.

In FIGS. 24(a), 24(b), and 24(c), we can see that the regenerator makes transmission distances of 400 km possible; FIG. 24(b) and 600 km; FIG. 24(c) with the signal eye completely open. If the regenerator is not used, the signal eye appears completely closed at a distance of 400 km, however, with the regenerator it is possible to obtain a completely open eye.

Figure 25A:
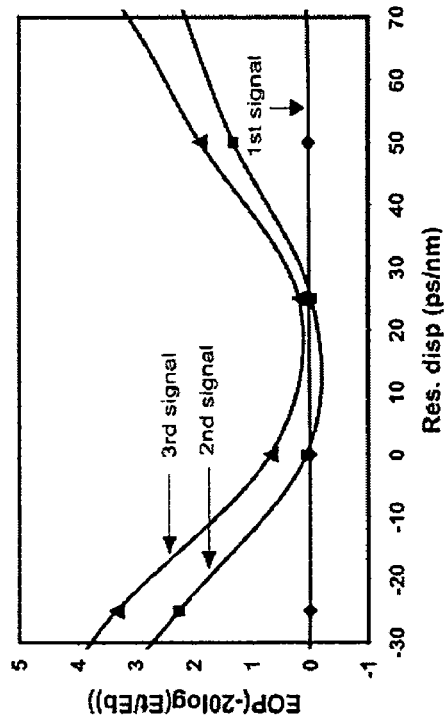
FIG. 25(a). D8PSK results, Q factor versus OSNR.
Figure 25B:
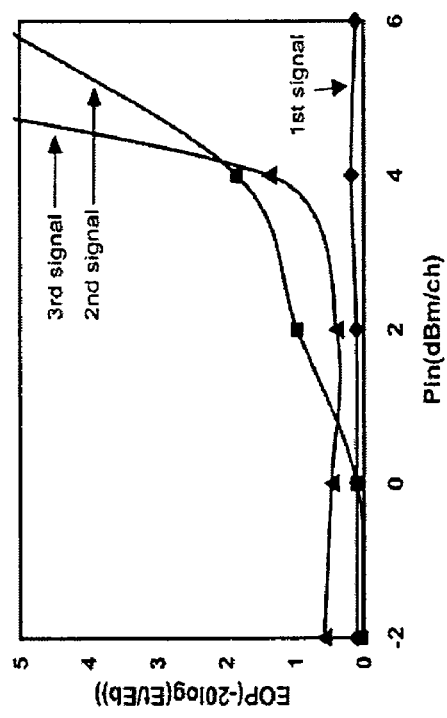
FIG. 25(b). EOP results versus residual dispersion.

FIGS. 25(a), 25(b), 25(c), and 25(d) show the results of the D8PSK modulation format at 64.5 Gbit/s. Note that FIG. 25(a) shows the results of the three outgoing signals obtained after remodulating the D8PSK signal. This Figure shows results from the Q factor in function of the optical signal to noise ratio (OSNR for its English acronym for Optical signal to noise ratio). Note that the results show an excellent Q factor when OSNR is 13.1 dB. However, it can be seen in the eye diagram that there are a few lines that make the eye close at this same OSNR of 13.1 dB for the third signal. Note that the majority of the high level lines or "1" open the eye very well, however, there are 2 lines that degrade the signal eye. The consequence of this is that the signal eye will not be 100% reliable and there will have to be an OSNR limit of OSNR 15 dB where the eye is shown to be completely open. FIG. 25(b) shows the results of the impact of chromatic dispersion.

Figure 25C:
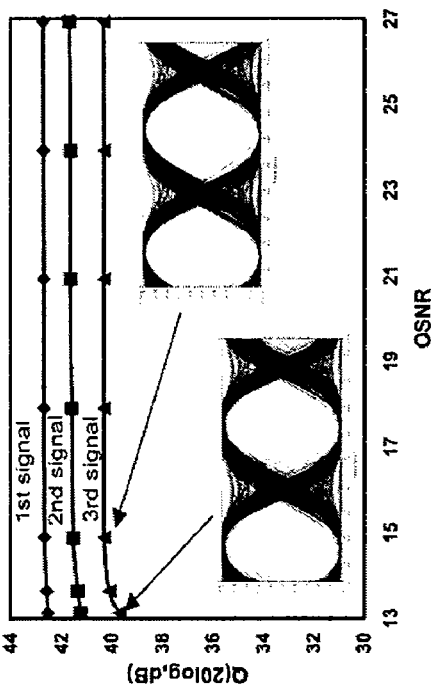
FIG. 25(c). EOP results versus differential group delay.
Figure 25D:
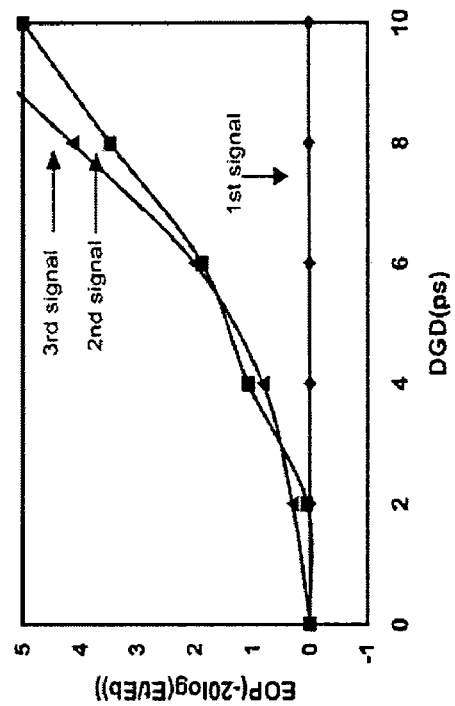
FIG. 25(d). EOP results versus transmission power.

To obtain these results a transmission distance of 600 km is used and a transmission power of −2 dBm for the transmission monomode fiber. If a limit for the eye-opening penalty is considered to be 0.5 dB, then, the third signal has a range for the residual dispersion of 35 ps/nm. Results of the polarization mode dispersion is another parameter to analyze. FIG. 25(c) shows the results for three outgoing signals from the modulators. The third and second signals give the best results due to the fact that greater electronic processing is required to obtain them. Results from the regenerator operation with respect to the non-linearity of the fibra are shown in FIG. 25(*d*) where we have the eye-opening penalty versus the signal power. This Figure presents results from the central channel in a nine channel system. As is known, the central channel in a multi-channel system is the channel that most suffers from the effect of the mixture of four wavelengths and it is for this reason that results presented are only from the central channel, i.e., the worst case scenario.

Having described my invention in a sufficient manner, I feel that it is an innovation and therefore, claim the content of the following clauses as my exclusive property:

1. An Optical Signal Phase Regenerator characterized by processing two identical signals or mirrors, using Phase Shift Differential Modulation where two mirrors use: an amplitude modulator that has as its inlets an optical signal and an electric control signal, where the electrical signal is made up of a clock signal with a time greater than T/2, where T is the period of a symbol, and a temporary delay unit, wherein the optical signal is transmitted to an optical coupler, which in turn is connected to an optical temporary delay unit and to an optical signal phase shifter with a phase difference of 180°, subsequently passing through an optical coupler and an optical amplifier, wherein the outgoing signal from the optical amplifier is sent in turn through the optical fiber to the amplitude modulator and to a PIN photodetector the function of which is to convert the optical signal to an electrical signal, which passes through a level inverter, wherein the electrical signal is used to control the amplitude modulator through which the optical signal passes and this modulates the signal to remove the power transitory responses of the optical signal giving as a result an optical signal regenerated with phase shift differential modulation.

2. The Optical Signal Phase Regenerator for Phase Shift Differential Modulation in accordance with claim 1, characterized in that the outgoing signal from a multiplexor of an optical multi-channel transmission system is introduced into it, wherein the signal is introduced into an amplitude modulator controlled by a clock signal with a T/2 duration, where T is the period of a symbol and to obtain the desired result, the incoming clock to the amplitude modulator must be synchronized with the incoming optical signal so that the high clock level interval matches the center of the symbol.

3. The Optical Signal Phase Regenerator for Phase Shift Differential Modulation in accordance with claim 1, characterized in that each of the mirrors are processed separately, and the signal obtained in the direct port shifts a time equivalent to the average symbol period T/2 and the outgoing signal from the coupler port of the first coupler, is phase shifted at 180°.

4. The Optical Signal Phase Regenerator for Phase Shift Differential Modulation in accordance with claim 1, characterized in that each optical coupler introduces a phase difference of 90° in which the total phase difference should be 180°.

5. The Optical Signal Phase Regenerator for Phase Shift Differential Modulation in accordance with claim 1, characterized in that both processed signals are introduced into the inlets of the coupler to obtain a complete period in the direct port of the second coupler.

6. The Optical Signal Phase Regenerator for Phase Shift Differential Modulation in accordance with claim 1, characterized in that the second coupler adds the two incoming signals together.

7. The Optical Signal Phase Regenerator for Phase Shift Differential Modulation in accordance, with claim 1, characterized in that the first mirror is not phase shifted, the other two mirrors created, pass through four couplers which causes a loss of 12 dBs (approximately 3 dBs for each coupler) and the configuration used in only two of them is phase shifted, i.e., a phase difference of 180°.

8. An Optical Signal Phase Regenerator characterized by processing three identical signals or mirrors, using Phase Shift Differential Modulation where three mirrors use: an amplitude modulator to an inlet which is modulated by a clock signal, the duration of which is T/3, where T is the period of a symbol, wherein the optical signal is sent to a first coupler, which produces two mirror sites, wherein the second mirror site is in turn sent to a second coupler which generates a third mirror site plus letting a second incoming mirror site pass through, further wherein the signal is reconstructed through two cascading couplers, where the three mirror sites are added together and one of the mirror sites is not delayed; another is delayed by one third of the symbol period and the third mirror site is delayed two thirds of a period, wherein the signal reconstructed by the cascading amplifiers is amplified and this signal is divided in two where one part of the signal is sent to a PIN detector the function of which is to convert the optical signal to an electrical signal, which passes through a level inverter, wherein this electrical signal is used to control the amplitude modulator through which the optical signal passes and this modulates the signal to remove the power transitory responses of the optical signal giving as a result an optical signal regenerated with phase shift differential modulation.

9. The Optical Signal Phase Regenerator for Phase Shift Differential Modulation in accordance with claim 8, characterized in that the third of the signals passes through the four couplers and suffers a loss of 12 dBs wherein the four couplers introduce a phase difference of 90° each producing a total phase difference of 360° and, therefore, the third mirror of the signal will not need to be compensated with an extra phase difference.

10. The Optical Signal Phase Regenerator for Phase Shift Differential Modulation in accordance with claim 8, characterized in that the second as well as the third mirror passes through the four couplers while the first only passes through two wherein the first of the mirror sites suffers a loss that is 6 dBs less than the other two and are attenuated so that the three signals have the same power level when leaving the couplers.

11. The Optical Signal Phase Regenerator for Phase Shift Differential Modulation in accordance with claim 8, characterized in that for three mirrors the outgoing signal must be reconstructed correctly adding the three mirrors where: one of the mirrors is not delayed; another is delayed by one third of a symbol period; the third mirror is delayed by two thirds of a period wherein the first mirror is not phase shifted because it passes through two couplers and none of these are phase shifted because both enter through the incoming port and exits through the direct port and the second replica, pass through four couplers which causes a loss of 12 dBs (approximately 3 dBs for each coupler) and the configuration used in only two of them is phase shifted, producing a phase difference of 180° wherein the third of the signals crosses the four couplers suffering a 12 dB loss.

12. The Optical Signal Phase Regenerator for Phase Shift Differential Modulation in accordance with claim 8, characterized in that the four couplers introduce a phase difference of 90° each producing a total phase difference of 360° and, therefore, the third signal will not need to be compensated with an extra phase difference wherein the second as well as the third mirror site cross four couplers while the first only crosses two wherein the first of the mirror sites suffers a loss that is 6 dBs less than the other two and are attenuated so that the three signals have the same power level when leaving the couplers.

13. The Optical Signal Phase Regenerator for Phase Shift Differential Modulation in accordance with claim 1 or claim 8, in which the synchronization process with the clock signal that controls the first modulator will be controlled by an electronic circuit that measures the signal quality received in the receiver and sends a signal to the delay unit of the clock signal so that the high clock level matches the maximum value of the shell and with the most stable value of the phase for each symbol.

14. The Optical Signal Phase Regenerator for Phase Shift Differential Modulation in accordance with claim 1 or claim 8, characterized in that the electronic control is made up of an element of scale and a limited level inverter (1/x) so that the low power does not cause excessively high spikes.

15. The Optical Signal Phase Regenerator for Phase Shift Differential Modulation in accordance with claim 1 or claim 8, characterized in that the regenerator must be placed after the multiplexor of the communication system and before the demodulators or decoders (receivers) of the signal.

16. The Optical Signal Phase Regenerator for Phase Shift Differential Modulation in accordance with claim 1 or claim 8, characterized in that the incoming signal to the regenerator, the description of the shell/signal phase, the high clock level coincides with the maximum value of the shell and with the most stable value of the phase for each symbol.

17. The Optical Signal Phase Regenerator for Phase Shift Differential Modulation in accordance, with claim 1, characterized in that in order to increase the level of power a doped erbium optical amplifier before the last amplitude modulator.

18. The Optical Signal Phase Regenerator for Phase Shift Differential Modulation in accordance with claim 1 or claim 8, characterized in that after amplifying the optical signal it is divided in two and one of the of the outlets of the optical divider connects to a photodetector and its gives an electrical signal proportional to the incoming optical signal shell.

19. The Optical Signal Phase Regenerator for Phase Shift Differential Modulation in accordance with claim 1 or claim 8, characterized in that the electric signal received is processed to obtain the signal to introduce to the corresponding amplitude modulator which reduces the transitory power responses of the optical signal.

20. The Optical Signal Phase Regenerator for Phase Shift Differential Modulation in accordance with claim 1 or claim 8, characterized in that the amplitude modulator is a passive element and the control signal cannot surpass the unit value and for this reason the inverter must be limited so that it does never gives an excessive value and in order to compensate for the delay a section of fiber is inserted which delays the electronic processing time signal so that the control and optical signal are synchronized in the second amplitude modulator.

21. The Optical Signal Phase Regenerator for Phase Shift Differential Modulation in accordance with claim 1 or claim 8, characterized in that the combination process for the mirrors has no effect on the outlet since it is using differential modulation and the resulting signal is obtained from the phase difference between two symbols for which the lack of phase continuity, produced by the combination of the mirrors in the couplers, from one symbol is compensated with the lack of continuity of the subsequent symbol.

22. The Optical Signal Phase Regenerator for Phase Shift Differential Modulation in accordance with claim 1 or claim 8, characterized in that any phase shift differential modulation format is used to regenerate the phase and the period of the phase, preferably DPSK, DQPSK, RZ-DQPSK, RZ-D8PSK, D8PSK, RZ-D16PSK, D16PSK.

23. The Optical Signal Phase Regenerator for Phase Shift Differential Modulation in accordance with claim 1 or claim 8, characterized in that the use of high spectral efficiency formats are enabled, such as DPSK, DQPSK, RZ-DQPSK, RZ-D8PSK, D8PSK, RZ-D16PSK, D16PSK for transmission distances which are greater than 600 km.

24. The Optical Signal Phase Regenerator for Phase Shift Differential Modulation in accordance, with claim 1 or claim 8, characterized in that it is capable of regenerating the phase and the period of phase shift differential modulation formats such as DPSK, DQPSK, RZ-DQPSK, RZ-D8PSK, D8PSK, RZ-D16PSK, D16PSK which operate at high rates of transmission on the order of 66 Gbit/s or greater.

25. The Optical Signal Phase Regenerator for Phase Shift Differential Modulation in accordance with claim 1 or claim 8, characterized in that it is capable of regenerating the phase and the period of phase shift differential modulation formats such as DPSK, DQPSK, RZ-DQPSK, RZ-D8PSK, D8PSK, RZ-D16PSK, D16PSK which operate at high spectral efficiencies of 1.2 bit/s/Hz.

26. The Optical Signal Phase Regenerator for Phase Shift Differential Modulation in accordance with claim 1 or claim 8, characterized in that using the regenerator improves the Q factor in 2 dB with respect to the results when the regenerator is not used with the DQPSK format and for a transmission distance of 600 km.

27. The Optical Signal Phase Regenerator for Phase Shift Differential Modulation in accordance with claim 1 or claim 8, characterized in that using the regenerator improves the Q factor significantly, in such a way that a transmission of 600 km may be achieved, with respect to the results when the regenerator is not used with the D8PSK format.

28. The Optical Signal Phase Regenerator for Phase Shift Differential Modulation in accordance with claim 1 or claim 8, characterized in that using the regenerator improves the eye of the signal significantly, in such a way that a transmission of 600 km may be achieved, with respect to the results when the regenerator is not used with the DSPSK format wherein a significant improvement in the eye of the signal in such a way that a minimum of 600 km may be achieved.

29. The Optical Signal Phase Regenerator for Phase Shift Differential Modulation in accordance with claim 1 or claim 8, characterized in that using the regenerator significantly improves the quality of the signal with there is residual dispersion, to 600 km of transmission wherein the regenerator has a residual tolerance of 50 ps/nm and 35 ps/nm when DQPSK and D8PSK are used respectively wherein the regenerator presented an improvement in the signal even when the residual dispersion is significant.

30. A Phase Shift Differential Modulation system characterized by the fact that it is made of a phase regenerator according to claim 1 or claim 8.

* * * * *

UNITED STATES PATENT AND TRADEMARK OFFICE
CERTIFICATE OF CORRECTION

| | | |
|---|---|---|
| PATENT NO. | : 8,280,261 B2 | Page 1 of 1 |
| APPLICATION NO. | : 12/519136 | |
| DATED | : October 2, 2012 | |
| INVENTOR(S) | : Gerardo Antonio Castanon Avila et al. | |

It is certified that error appears in the above-identified patent and that said Letters Patent is hereby corrected as shown below:

On the Title page, Item (73) should read

-- (73) Assignee: Instituto Tecnológico y de Estudios Superiores de Monterrey --.

Signed and Sealed this
Seventeenth Day of September, 2013

Teresa Stanek Rea
*Deputy Director of theUnited States Patent and Trademark Office*